US012695565B2

(12) United States Patent
Wu et al.

(10) Patent No.:  US 12,695,565 B2
(45) Date of Patent:      Jul. 28, 2026

(54) METHOD AND DEVICE FOR SIGNAL TRANSMISSION USING TIMING ADVANCES

(71) Applicant: Apogee 5G Global, LLC, Plano, TX (US)

(72) Inventors: Keying Wu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 361 days.

(21) Appl. No.: 18/107,517

(22) Filed: Feb. 9, 2023

(65) Prior Publication Data

US 2023/0275720 A1      Aug. 31, 2023

(30) Foreign Application Priority Data

Feb. 26, 2022     (CN) .......................... 202210180232.4

(51) Int. Cl.
H04W 72/04          (2023.01)
H04L 5/00            (2006.01)
H04W 76/00          (2018.01)
H04W 88/08          (2009.01)

(52) U.S. Cl.
CPC .................................. H04L 5/0048 (2013.01)

(58) Field of Classification Search
None
See application file for complete search history.

(56) References Cited

U.S. PATENT DOCUMENTS

| | | | |
|---|---|---|---|
| 11,159,347 B2 | 10/2021 | Ahn et al. | |
| 2016/0192376 A1* | 6/2016 | Lee ........................ | H04W 48/20 |
| | | | 370/252 |
| 2021/0321355 A1* | 10/2021 | Gao .................. | H04W 56/0045 |
| 2023/0180166 A1* | 6/2023 | Rudolf .............. | H04W 56/0005 |
| | | | 370/280 |
| 2024/0276415 A1* | 8/2024 | Xu ...................... | H04B 7/18513 |
| 2024/0414674 A1* | 12/2024 | Xu .................... | H04W 74/0833 |
| 2025/0247879 A1 | 7/2025 | Zhu | |

FOREIGN PATENT DOCUMENTS

| | | | | |
|---|---|---|---|---|
| WO | WO-2018233503 A1 * | 12/2018 | ........ | H04W 74/0866 |
| WO | 2022015750 A1 | 1/2022 | | |

OTHER PUBLICATIONS

Third Generation Partnership Project, "Technical Specification Group Radio Access Network; NR; Physical channels and modulation (Release 17)," 3GPP TS 38.211 V17.0.0 (Dec. 2021).

(Continued)

*Primary Examiner* — Maharishi V Khirodhar
(74) *Attorney, Agent, or Firm* — Volpe Koenig

(57) ABSTRACT
The present application discloses a method and a device in a node for wireless communications. A first node transmits a first information block. Herein, the first information block is related to both a first TA and a second TA; the first TA is unequal to the second TA. The method above allows the UE to report information related to different timing advances, thus enabling the base station to configure transmission parameters rationally according to relations among different timing advances, thus enhancing the transmission performance.

14 Claims, 5 Drawing Sheets

(56)  References Cited

OTHER PUBLICATIONS

Third Generation Partnership Project, "Technical Specification Group Radio Access Network; NR; Multiplexing and channel coding (Release 17)," 3GPP TS 38.212 V17.0.0 (Dec. 2021).

Third Generation Partnership Project, "Technical Specification Group Radio Access Network; NR; Physical layer procedures for control (Release 17)," 3GPP TS 38.213 V17.0.0 (Dec. 2021).

Third Generation Partnership Project, "Technical Specification Group Radio Access Network; NR; Physical layer procedures for data (Release 17)," 3GPP TS 38.214 V17.0.0 (Dec. 2021).

Third Generation Partnership Project, "Technical Specification Group Radio Access Network; NR; Radio Resource Control (RRC) protocol specification (Release 16)," 3GPP TS 38.331 V16.7.0 (Dec. 2021).

CATT, "On Two TAs for UL multi-DCI for multi-TRP operation," 3GPP TSG RAN WG1 #109-e, R1-2203442, e-Meeting (May 9-20, 2022).

Intel Corporation, "Discussion on RAN2 LS—timing advance calculation using time difference measurements," 3GPP TSG RAN WG1 Meeting #66, R1-112216, Athens, Greece (Aug. 22-26, 2011).

* cited by examiner

100

5GS/EPS 200

Second node U1      First node U2

S5101.transmitting reference signal in first reference signal resource set

F51. optional

—reference signal—

S5201.receiving reference signal in first reference signal resource set

F52. optional

S5102.transmitting reference signal in second reference signal resource set

F53. optional

—reference signal—

S5202.receiving reference signal in second reference signal resource set

F54. optional

S521.transmitting first information block

—first information block—

S511.receiving first information block

S5203.transmitting SRS in first SRS resource set

F55. optional

—SRS—

S5103.receiving SRS in first SRS resource set

F56. optional

S5204.transmitting SRS in second SRS resource set

F57. optional

—SRS—

S5104.receiving SRS in second SRS resource set

F58. optional

S5105.transmitting first signaling

—first signaling—

S5205.receiving first signaling

F59. optional

S5206.transmitting first signal

—first signal—

S5106.receiving first signal

F510. optional

End      End

FIG. 5

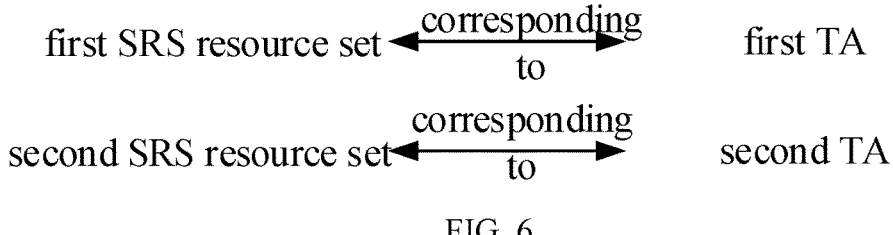

first SRS resource set ⟷ corresponding to ⟷ first TA second SRS resource set ⟷ corresponding to ⟷ second TA

FIG. 6

METHOD AND DEVICE FOR SIGNAL TRANSMISSION USING TIMING ADVANCES

CROSS REFERENCE TO RELATED APPLICATIONS

This application claims the priority benefit of Chinese Patent Application No. 202210180232.4, filed on Feb. 26, 2022, the full disclosure of which is incorporated herein by reference.

BACKGROUND

Technical Field

The present application relates to transmission methods and devices in wireless communication systems, and in particular to a method and device for radio signal transmission in a wireless communication system supporting cellular networks.

Related Art

The Multi-antenna technique is a crucial part in the 3rd Generation Partner Project (3GPP) Long-term Evolution (LTE) and New Radio (NR) systems. More than one antenna can be configured, at the communication node, e.g., a base station or a User Equipment (UE), to obtain extra degree of freedom in space. Multiple antennas form through beamforming a beam pointing in a specific direction to enhance the communication quality. The degree of freedom provided by a multi-antenna system can be used to enhance the transmission reliability and/or throughput. When the multiple antennas belong to multiple Transmitter Receiver Points (TRPs)/panels, spatial differences between TRPs/panels can be taken advantage of to obtain extra diversity gains. In NR Release (R) 17, an uplink transmission based on multiple beams/TRPs/panels is supported, which is used for improving the reliability of the uplink transmission. In R17, a UE can be configured with multiple codebook or non-codebook based Sounding Reference Signal (SRS) resource sets to implement multi-beam/TRP/panel uplink transmission.

SUMMARY

The applicants find through researches that different beams/TRPs/panels may correspond to different Timing Advances (TAs). Therefore, how to support multiple different Timing Advances (TAs) becomes an issue that needs to be addressed.

To address the above problem, the present application provides a solution. It should be noted that although the description above takes scenarios of the cellular network, uplink transmission, multi-beam/TRP/panel, and different TAs as examples; the present application is also applicable to other scenarios such as sidelink transmission, downlink transmission, single-beam/TRP/panel and the same TA, where technical effects similar to those in NR V2X can be achieved. Additionally, the adoption of a unified solution for various scenarios, including but not limited to those of the cellular network, sidelink, uplink transmission, downlink transmission, multi-beam/TRP/panel, and single-beam/TRP/panel, the same or different TAs, contributes to the reduction of hardcore complexity and costs. In the case of no conflict, the embodiments of a first node and the characteristics in the embodiments may be applied to a second node, and vice versa. What's more, the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

transmitting a first information block;

herein, the first information block is related to both a first Timing Advance (TA) and a second TA; the first TA is unequal to the second TA.

In one embodiment, a problem to be solved in the present application includes: how to support multiple different Timing Advances (TAs). By reporting information relevant to two timing advances, the above method enables the base station to configure transmission parameters rationally according to the relation between these timing advances, hence the solution to the problem.

In one embodiment, an advantage of the above method includes: allowing the UE to report information relevant to two timing advances, which enables the base station to configure transmission parameters rationally according to the relation between these timing advances, hence the enhancement of the transmission performance.

According to one aspect of the present application, characterized in that a first SRS resource set corresponds to the first TA, while a second SRS resource set corresponds to the second TA; the first SRS resource set and the second SRS resource set belong to a same cell.

According to one aspect of the present application, characterized in that the first TA and the second TA are used to determine a first timing difference, the first information block being related to the first timing difference.

According to one aspect of the present application, characterized in comprising:

receiving a reference signal in a first reference signal resource set; and receiving a reference signal in a second reference signal resource set;

herein, the first reference signal resource set comprises at least one reference signal resource, while the second reference signal resource set comprises at least one reference signal resource; the first reference signal resource set is used to determine a first downlink timing, while the second reference signal resource set is used to determine a second downlink timing; the first downlink timing and the first TA are used to determine a first uplink timing, while the second downlink timing and the second TA are used to determine a second uplink timing; the first uplink timing and the second uplink timing are used to determine a first timing difference; the first information block is related to the first timing difference.

In one embodiment, characteristics of the above method include: the first information block is used for reporting to the base station a difference between uplink timings respectively corresponding to two timing advances.

In one embodiment, an advantage of the above method includes: allowing the base station to configure transmission parameters in a rational way based on the difference between uplink timings corresponding to two timing advances, including but not limited to a time interval between uplink transmissions corresponding to different beams/TRPs/panels, thus avoiding the result that the uplink transmissions corresponding to different beams/TRPs/panels are overlapping in time.

According to one aspect of the present application, characterized in that the first timing difference is used to determine whether a first condition is satisfied; as a response to the first condition being satisfied, the first node transmits the first information block.

According to one aspect of the present application, characterized in comprising:

receiving a first signaling, the first signaling being used to determine a first RE set and a second RE set;

herein, the first RE set and the second RE set are respectively reserved for a first sub-signal and a second sub-signal; the first signaling indicates that the first RE set is associated with the first SRS resource set, and the first signaling indicates that the second RE set is associated with the second SRS resource set; the first TA and the first RE set are used to determine a first time window, while the second TA and the second RE set are used to determine a second time window; the first time window and the second time window are overlapping, a third time window comprising the overlap between the first time window and the second time window; the first node drops transmitting a part of the first sub-signal that is located within the third time window, or, the first node drops transmitting a part of the second sub-signal that is located within the third time window; or, the first node drops transmitting a part of the first sub-signal that is located within the third time window and a part of the second sub-signal that is located within the third time window.

According to one aspect of the present application, characterized in comprising:

transmitting a first signal;

herein, the first signaling comprises scheduling information of the first signal, the first signal comprising a part of at least one of the first sub-signal or the second sub-signal that does not belong to the third time window.

According to one aspect of the present application, the first node comprises a UE.

According to one aspect of the present application, the first node comprises a relay node.

The present application provides a method in a second node for wireless communications, comprising:

receiving a first information block;

herein, the first information block is related to both a first Timing Advance (TA) and a second TA; the first TA is unequal to the second TA.

According to one aspect of the present application, characterized in that a first SRS resource set corresponds to the first TA, while a second SRS resource set corresponds to the second TA; the first SRS resource set and the second SRS resource set belong to a same cell.

According to one aspect of the present application, characterized in that the first TA and the second TA are used to determine a first timing difference, the first information block being related to the first timing difference.

According to one aspect of the present application, characterized in comprising at least one of:

transmitting a reference signal in a first reference signal resource set; or transmitting a reference signal in a second reference signal resource set;

herein, the first reference signal resource set comprises at least one reference signal resource, while the second reference signal resource set comprises at least one reference signal resource; the first reference signal resource set is used to determine a first downlink timing, while the second reference signal resource set is used to determine a second downlink timing; the first downlink timing and the first TA are used to determine a first uplink timing, while the second downlink timing and the second TA are used to determine a second uplink timing; the first uplink timing and the second uplink timing are used to determine a first timing difference; the first information block is related to the first timing difference.

According to one aspect of the present application, characterized in that the first timing difference is used to determine whether a first condition is satisfied; as a response to the first condition being satisfied, a transmitter of the first information block transmits the first information block.

According to one aspect of the present application, characterized in comprising:

transmitting a first signaling, the first signaling being used to determine a first RE set and a second RE set;

herein, the first RE set and the second RE set are respectively reserved for a first sub-signal and a second sub-signal; the first signaling indicates that the first RE set is associated with the first SRS resource set, and the first signaling indicates that the second RE set is associated with the second SRS resource set; the first TA and the first RE set are used to determine a first time window, while the second TA and the second RE set are used to determine a second time window; the first time window and the second time window are overlapping, a third time window comprising the overlap between the first time window and the second time window; a target receiver of the first signaling drops transmitting a part of the first sub-signal that is located within the third time window, or, a target receiver of the first signaling drops transmitting a part of the second sub-signal that is located within the third time window; or, a target receiver of the first signaling drops transmitting a part of the first sub-signal that is located within the third time window and a part of the second sub-signal that is located within the third time window.

According to one aspect of the present application, characterized in comprising:

receiving a first signal;

herein, the first signaling comprises scheduling information of the first signal, the first signal comprising a part of at least one of the first sub-signal or the second sub-signal that does not belong to the third time window.

According to one aspect of the present application, the second node is a base station.

According to one aspect of the present application, the second node is a UE.

According to one aspect of the present application, the second node is a relay node.

The present application provides a first node for wireless communications, comprising:

a first processor, transmitting a first information block;

herein, the first information block is related to both a first Timing Advance (TA) and a second TA; the first TA is unequal to the second TA.

The present application provides a second node for wireless communications, comprising:

a second processor, receiving a first information block;

herein, the first information block is related to both a first Timing Advance (TA) and a second TA; the first TA is unequal to the second TA.

In one embodiment, compared with the prior art, the present application is advantageous in the following aspects:

By allowing the UE to report information relevant to different timing advances, the base station is enabled to configure transmission parameters rationally according to relations among these timing advances, hence the enhancement of the transmission performance.

BRIEF DESCRIPTION OF THE DRAWINGS

Other features, objects and advantages of the present application will become more apparent from the detailed description of non-restrictive embodiments taken in conjunction with the following drawings:

FIG. 5 illustrates a flowchart of transmission according to one embodiment of the present application.

FIG. 6 illustrates a schematic diagram of a first SRS resource set corresponding to a first TA and a second SRS resource set corresponding to a second TA according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
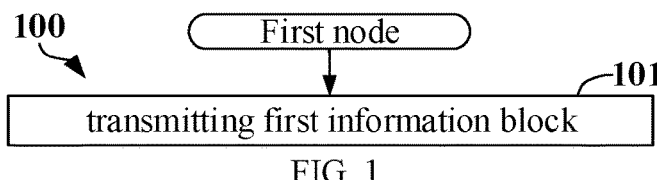
FIG. 1 illustrates a flowchart of a first information block according to one embodiment of the present application.

Embodiment 1 illustrates a flowchart of a first information block according to one embodiment of the present application, as shown in FIG. 1. In 100 illustrated by FIG. 1, each box represents a step. Particularly, the sequential step arrangement in each box herein does not imply a chronological order of steps marked respectively by these boxes.

In Embodiment 1, the first node in the present application transmits a first information block in step 101. herein, the first information block is related to both a first Timing Advance (TA) and a second TA; the first TA is unequal to the second TA.

In one embodiment, the first information block is carried by a higher layer signaling.

In one embodiment, the first information block is carried by a Radio Resource Control (RRC) signaling.

In one embodiment, the first information block is carried by an RRC message.

In one embodiment, the first information block is carried by UE capability information.

In one embodiment, the first information block is carried by a UECapabilityInformation message.

In one embodiment, the first information block is carried by a Medium Access Control layer Control Element (MAC CE).

In one embodiment, the first information block is carried by a physical layer signaling.

In one embodiment, the first information block is carried by Uplink control information (UCI).

In one embodiment, the first information block comprises all or partial information in one or more Information Elements (IEs).

In one embodiment, the first information block comprises all or partial information in at least one UE capability IE.

In one embodiment, the first information block comprises all or partial information in an IE UECapabilityInformation message.

In one embodiment, the first information block comprises a MAC CE.

Typically, the first TA comprises a value of a Timing advance (TA), and the second TA comprises a value of a TA.

Typically, the first TA comprises a TA, and the second TA comprises a TA.

Typically, the first TA is a value of a TA, and the second TA is a value of a TA.

Typically, the first TA is a TA, and the second TA is a TA.

Typically, the first TA comprises a timing advance between a downlink and an uplink, while the second TA comprises a timing advance between an uplink and a downlink.

Typically, the first TA is a timing advance between an uplink and a downlink, while the second TA is a timing advance between an uplink and a downlink.

In one embodiment, the first TA and the second TA are for different Time-Advance Groups (TAGs).

In one embodiment, the first TA and the second TA are for a same TAG.

In one embodiment, the first TA is a time offset between an uplink timing and a downlink timing, while the second TA is a time offset between an uplink timing and a downlink timing.

In one embodiment, the first TA is a timing advance of an uplink timing relative to a downlink timing, while the second TA is a timing advance of an uplink timing relative to a downlink timing.

In one embodiment, the first TA and the second TA are respectively NTAs.

In one embodiment, for the definition of the NTA, refer to 3 GPP TS38.211, Section 4.3.1.

In one embodiment, the first TA and the second TA are respectively TTAs.

In one embodiment, for the definition of the TTA, refer to 3GPP TS38.211, Section 4.3.1.

In one embodiment, a unit of the first TA and a unit of the second TA are respectively measured in Tc, the Tc being a basic time unit.

In one embodiment, the Tc is a basic time unit of New Radio (NR).

In one embodiment, for the definition of the Tc, refer to 3GPP TS38.211, Section 4.1.

In one embodiment, a unit of the first TA and a unit of the second TA are respectively measured in milliseconds (ms).

In one embodiment, a unit of the first TA and a unit of the second TA are respectively measured in seconds (s).

Typically, the first TA and the second TA are applied in a same cell.

Typically, the first TA and the second TA are applied in a same BandWidth Part (BWP).

Typically, the first TA and the second TA are applied in a same Carrier.

In one embodiment, the first TA and the second TA are used to determine the first information block.

In one embodiment, the first TA and the second TA are used to trigger the first information block.

In one embodiment, the first TA and the second TA are used to determine that the first information block is transmitted.

In one embodiment, the first TA and the second TA are used to determine what is contained in the first information block.

Embodiment 2

Figure 2:
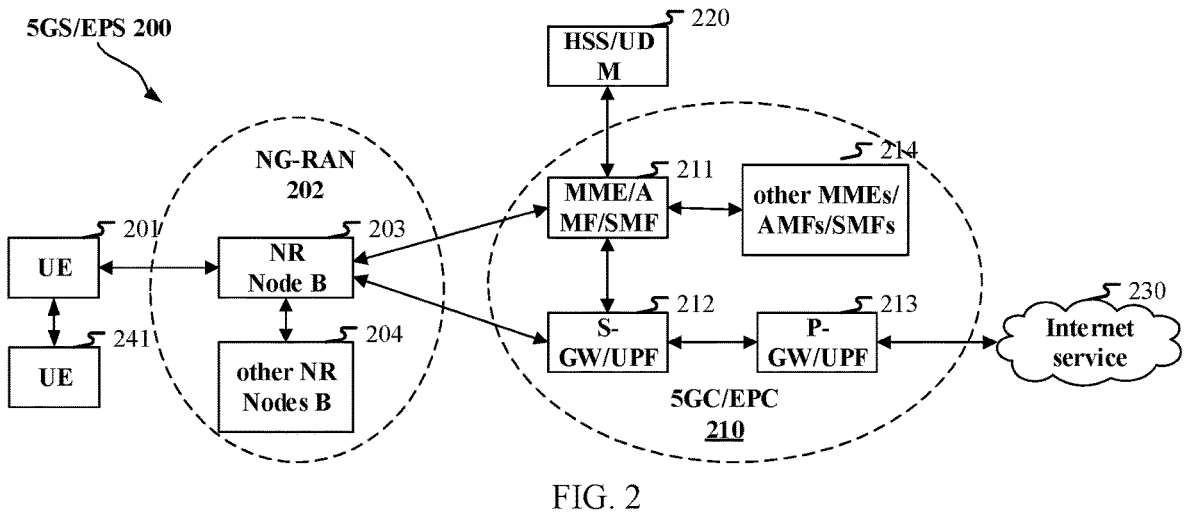
FIG. 2 illustrates a schematic diagram of a network architecture according to one embodiment of the present application.

Embodiment 2 illustrates a schematic diagram of a network architecture according to one embodiment of the present application, as shown in FIG. 2.

FIG. 2 is a diagram illustrating a network architecture of Long-Term Evolution (LTE), Long-Term Evolution Advanced (LTE-A) and future 5G systems. The LTE, or LTE-A or future 5G network architecture 200 may be called an Evolved Packet System (EPS) 200. The 5G NR or LTE network 200 can be called a 5G System/Evolved Packet System (5GS/EPS) 200 or other appropriate terms. The 5GS/EPS 200 may comprise one or more UEs 201, a UE 241 in sidelink communication with the UE(s) 201, an NG-RAN 202, a 5G CoreNetwork/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises a New Radio (NR) node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present application includes the UE 201.

In one embodiment, the second node in the present application includes the gNB 203.

In one embodiment, a radio link between the UE 201 and the gNB 203 includes a cellular link.

In one embodiment, the second node in the present application includes the UE 241.

In one embodiment, a radio link between the UE 201 and the UE 241 includes a sidelink.

In one embodiment, a transmitter of the first information block includes the UE 201.

In one embodiment, a receiver of the first information block includes the gNB 203.

In one embodiment, a receiver of the first information block includes the UE 241.

In one embodiment, the UE 201 supports multi-panel/TRP transmission based on multiple TAs.

Embodiment 3

Figure 3:
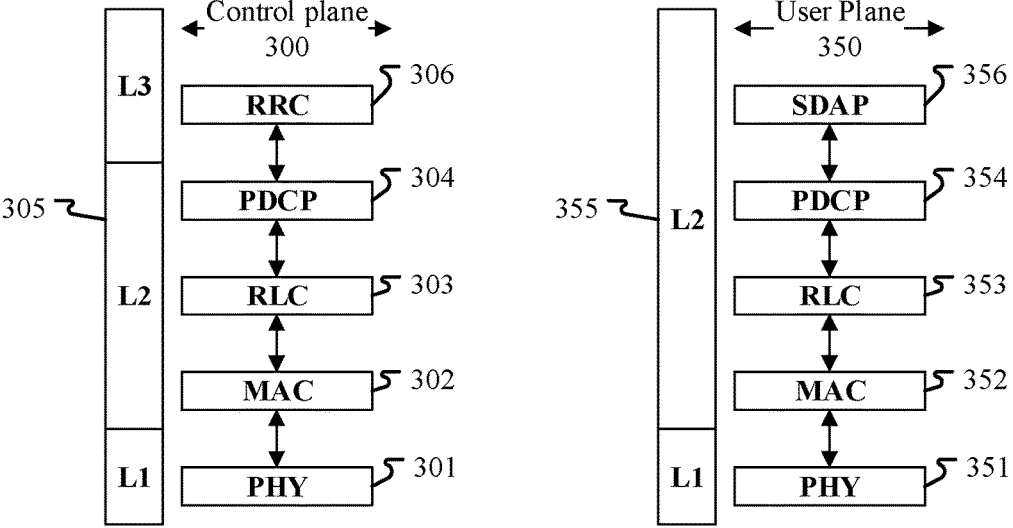
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to the present application, as shown in FIG. 3.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first communication node and the second communication node or between two UEs. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead.

The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information block is generated by the PHY 301, or the PHY 351.

In one embodiment, the first information block is generated by the MAC sublayer 302 or the MAC sublayer 352.

In one embodiment, the first information block is generated by the RRC sublayer 306.

In one embodiment, the higher layer in the present application refers to a layer above a PHY layer.

Embodiment 4

Figure 4:
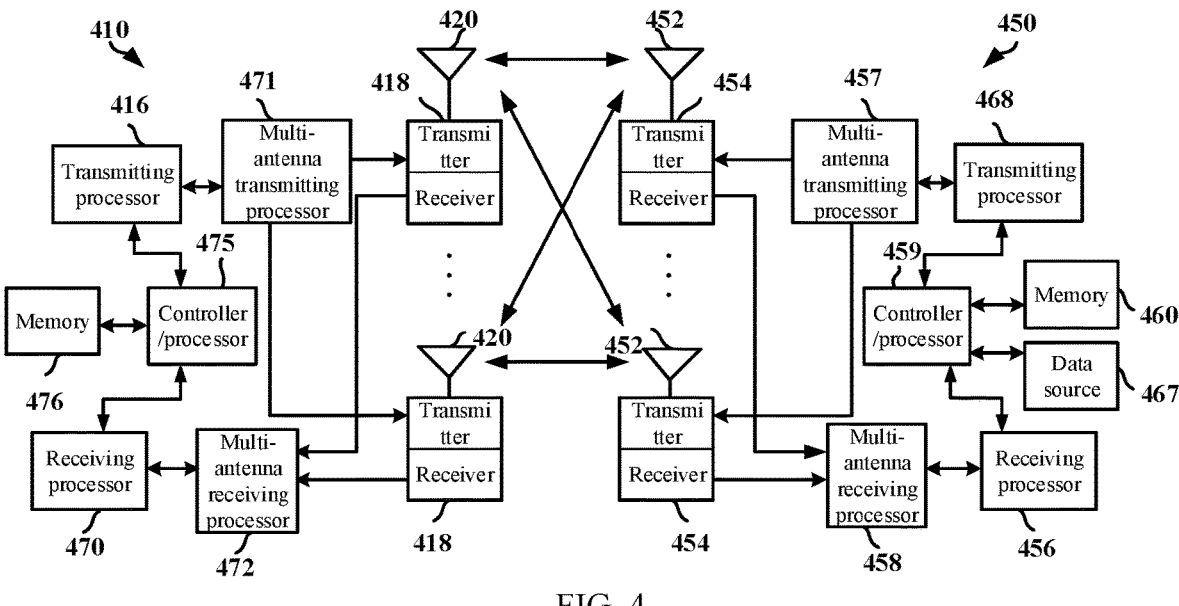
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beam-forming processing on encoded and modulated signals to generate one or more parallel streams. The transmitting processor 416 then maps each parallel stream into a subcar-rier. The modulated symbols are multiplexed with a refer-ence signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each trans-mitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multi-carrier symbol stream to be provided to the receiving processor 456. The receiving processor 456 and the multi-antenna receiving processor 458 perform signal processing functions of the L1 layer. The multi-antenna receiving processor 458 performs reception analog precoding/beam-forming on a baseband multicarrier symbol stream provided by the receiver 454. The receiving processor 456 converts baseband multicarrier symbol streams which have gone through reception analog precoding/beamforming opera-tions from time domain to frequency domain using FFT. In frequency domain, physical layer data signals and reference signals are de-multiplexed by the receiving processor 456, where the reference signals are used for channel estimation while data signals are processed in the multi-antenna receiv-ing processor 458 by multi-antenna detection to recover any parallel stream targeting the second communication device 450. Symbols on each parallel stream are demodulated and recovered in the receiving processor 456 to generate a soft decision. Then the receiving processor 456 decodes and de-interleaves the soft decision to recover the higher-layer data and control signal transmitted by the first communica-tion device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL transmission, the controller/pro-cessor 459 provides de-multiplexing between a transport channel and a logical channel, packet reassembling, decryp-tion, header decompression, control signal processing so as to recover a higher-layer packet from the core network. The higher-layer packet is later provided to all protocol layers above the L2 layer. Or various control signals can be provided to the L3 for processing. The controller/processor 459 is also in charge of using ACK and/or NACK protocols for error detection as a way to support HARQ operation.

In a transmission from the second communication device 450 to the first communication device 410, at the second communication device 450, the data source 467 is config-ured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multi-plexing between a logical channel and a transport channel based on radio resource allocation for the first communica-tion device 410 so as to provide the L2 layer functions used for the user plane and the control plane. The controller/processor 459 is responsible for HARQ operation, retrans-mission of a lost packet and a signaling to the first commu-nication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting proces-sor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiv-ing function of the second communication device 450 described in the transmission from the first communication device 410 to the second communication device 450. Each receiver 418 receives a radio frequency signal via a corre-sponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides demultiplexing between a transport channel and a logical channel, packet reassembling, decryption, header decompression and control signal processing so as to recover a higher-layer packet from the second communica-tion device 450. The higher-layer packet coming from the controller/processor 475 may be provided to the core net-work. The controller/processor 475 can also perform error detection using ACK and/or NACK protocols to support HARQ operation.

In one embodiment, the second communication node 450 comprises at least one processor and at least one memory, the at least one memory comprises computer program codes; the at least one memory and the computer program codes are configured to be used in collaboration with the at least one processor. The second communication device 450 at least receives the first information block.

In one embodiment, the second communication node 450 comprises a memory that stores a computer readable instruc-tion program, the computer readable instruction program generates actions when executed by at least one processor, which include: receiving the first information block.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits the first information block.

In one embodiment, the first communication device 410 comprises a memory that stores a computer readable instruction program, the computer readable instruction program generates actions when executed by at least one processor, which include: transmitting the first information block.

In one embodiment, the first node in the present application comprises the second communication device 450.

In one embodiment, the second node in the present application comprises the first communication device 410.

In one embodiment, at least one of the antenna 420, the receiver 418, the receiving processor 470, the multi-antenna receiving processor 472, the controller/processor 475 or the memory 476 is used to receive the first information block; at least one of the antenna 452, the transmitter 454, the transmitting processor 468, the multi-antenna transmitting processor 457, the controller/processor 459, the memory 460 or the data source 467 is used to transmit the first information block.

In one embodiment, at least one of the antenna 452, the receiver 454, the receiving processor 456, the multi-antenna receiving processor 458, the controller/processor 459, the memory 460 or the data source 467 is used to receive a reference signal in the first reference signal resource set; at least one of the antenna 420, the transmitter 418, the transmitting processor 416, the multi-antenna transmitting processor 471, the controller/processor 475 or the memory 476 is used to transmit a reference signal in the first reference signal resource set.

In one embodiment, at least one of the antenna 452, the receiver 454, the receiving processor 456, the multi-antenna receiving processor 458, the controller/processor 459, the memory 460 or the data source 467 is used to receive a reference signal in the second reference signal resource set; at least one of the antenna 420, the transmitter 418, the transmitting processor 416, the multi-antenna transmitting processor 471, the controller/processor 475 or the memory 476 is used to transmit a reference signal in the second reference signal resource set.

In one embodiment, at least one of the antenna 452, the receiver 454, the receiving processor 456, the multi-antenna receiving processor 458, the controller/processor 459, the memory 460 or the data source 467 is used to receive the first signaling; at least one of the antenna 420, the transmitter 418, the transmitting processor 416, the multi-antenna transmitting processor 471, the controller/processor 475 or the memory 476 is used to transmit the first signaling.

In one embodiment, at least one of the antenna 420, the receiver 418, the receiving processor 470, the multi-antenna receiving processor 472, the controller/processor 475 or the memory 476 is used to receive the first signal; at least one of the antenna 452, the transmitter 454, the transmitting processor 468, the multi-antenna transmitting processor 457, the controller/processor 459, the memory 460 or the data source 467 is used to transmit the first signal.

Embodiment 5

Embodiment 5 illustrates a flowchart of transmission according to one embodiment of the present application; as shown in FIG. 5. In FIG. 5, a second node U1 and a first node U2 are communication nodes that transmit via an air interface. In FIG. 5, steps marked by boxes F51 to F510 are optional, respectively.

The second node U1 transmits a reference signal in a first reference signal resource set in step S5101; and transmits a reference signal in a second reference signal resource set in step S5102; receives a first information block in step S511;

receives an SRS in a first SRS resource set in step S5103; and receives an SRS in a second SRS resource set in step S5104; transmits a first signaling in step S5105; and receives a first signal in step S5106.

The first node U2 receives a reference signal in a first reference signal resource set in step S5201; and receives a reference signal in a second reference signal resource set in step S5202; transmits a first information block in step S521; transmits an SRS in a first SRS resource set in step S5203; and transmits an SRS in a second SRS resource set in step S5204; receives a first signaling in step S5205; and receives a first signal in step S5206.

In Embodiment 5, the first information block is related to both a first Timing Advance (TA) and a second TA; the first TA is unequal to the second TA.

In one embodiment, the first node U2 is the first node in the present application.

In one embodiment, the second node U1 is the second node in the present application.

In one embodiment, an air interface between the second node U1 and the first node U2 includes a radio interface between a base station and a UE.

In one embodiment, an air interface between the second node U1 and the first node U2 includes a radio interface between a relay node and a UE.

In one embodiment, an air interface between the second node U1 and the first node U2 includes a radio interface between a UE and another UE.

In one embodiment, the second node U1 is a maintenance base station for a serving cell of the first node U2.

In one embodiment, the first information block is transmitted in an uplink physical layer control channel (i.e., an uplink channel only capable of bearing a physical layer signaling).

In one embodiment, the first information block is transmitted in a Physical Uplink Control Channel (PUCCH).

In one embodiment, the first information block is transmitted in an uplink physical layer data channel (i.e., an uplink channel capable of bearing physical layer data).

In one embodiment, the first information block is transmitted in a Physical Uplink Shared Channel (PUSCH).

In one embodiment, the step marked by the box F51 in FIG. 5 exists, and the second node U1 transmits a reference signal in the first reference signal resource set.

In one embodiment, the step marked by the box F52 in FIG. 5 exists, and the first node U2 receives a reference signal in the first reference signal resource set.

In one embodiment, the first node U2 receives a reference signal in each reference signal resource in the first reference signal resource set.

In one embodiment, the first node U2 receives a reference signal in at least one reference signal resource in the first reference signal resource set.

In one embodiment, steps marked by the box F51 and the box F52 in FIG. 5 exist.

In one embodiment, the step marked by the box F51 in FIG. 5 does not exist while the step marked by the box F52 in FIG. 5 exists.

In one subembodiment, a reference signal in the first reference signal resource set is transmitted by another node different from the second node U1.

In one embodiment, the step marked by the box F53 in FIG. 5 exists, and the second node U1 transmits a reference signal in the second reference signal resource set.

In one embodiment, the step marked by the box F54 in FIG. 5 exists, and the first node U2 receives a reference signal in the second reference signal resource set.

In one embodiment, the first node U2 receives a reference signal in each reference signal resource in the second reference signal resource set.

In one embodiment, the first node U2 receives a reference signal in at least one reference signal resource in the second reference signal resource set.

In one embodiment, steps marked by the box F53 and the box F54 in FIG. 5 exist.

In one embodiment, the step marked by the box F53 in FIG. 5 does not exist while the step marked by the box F54 in FIG. 5 exists.

In one subembodiment, a reference signal in the second reference signal resource set is transmitted by another node different from the second node U1.

In one embodiment, steps marked by the box F52 and the box F54 in FIG. 5 exist; the first node U2 receives a reference signal in the first reference signal resource set, and receives a reference signal in the second reference signal resource set.

In one embodiment, steps marked by the box F51 and the box F53 in FIG. 5 exist; the second node U1 transmits a reference signal in the first reference signal resource set, and transmits a reference signal in the second reference signal resource set.

In one embodiment, the step marked by the box F51 in FIG. 5 exists, while the step marked by the box F53 in FIG. 5 does not exist; the second node U1 transmits a reference signal in only the first reference signal resource set of the first reference signal resource set and the second reference signal resource set.

In one subembodiment, a reference signal in the second reference signal resource set is transmitted by another node different from the second node U1.

In one embodiment, the step marked by the box F51 in FIG. 5 does not exist, while the step marked by the box F53 in FIG. 5 exists; the second node U1 transmits a reference signal in only the second reference signal resource set of the first reference signal resource set and the second reference signal resource set.

In one subembodiment, a reference signal in the first reference signal resource set is transmitted by another node different from the second node U1.

In one embodiment, steps marked by the box F51, the box F52, the box F53 and the box F54 in FIG. 5 exist.

In one embodiment, the step marked by the box F55 in FIG. 5 exists, and the first node U2 transmits an SRS in the first SRS resource set.

In one embodiment, the first node U2 transmits an SRS in each SRS resource in the first SRS resource set.

In one embodiment, the step marked by the box F56 in FIG. 5 exists, and the second node U1 receives an SRS in the first SRS resource set.

In one embodiment, steps marked by the box F55 and the box F56 in FIG. 5 exist.

In one embodiment, the step marked by the box F55 in FIG. 5 exists, while the step marked by the box F56 in FIG. 5 does not exist.

In one subembodiment, a target receiver of SRS transmitted in the first SRS resource set is another node different from the second node U1.

In one embodiment, the step marked by the box F57 in FIG. 5 exists, and the first node U2 transmits an SRS in the second SRS resource set.

In one embodiment, the first node U2 transmits an SRS in each SRS resource in the second SRS resource set.

In one embodiment, the step marked by the box F58 in FIG. 5 exists, and the second node U1 receives an SRS in the second SRS resource set.

In one embodiment, steps marked by the box F57 and the box F58 in FIG. 5 exist.

In one embodiment, the step marked by the box F57 in FIG. 5 exists, while the step marked by the box F58 in FIG. 5 does not exist.

In one subembodiment, a target receiver of SRS transmitted in the second SRS resource set is another node different from the second node U1.

In one embodiment, steps marked by the box F55 and the box F57 in FIG. 5 exist; the first node U2 transmits an SRS in the first SRS resource set, and transmits an SRS in the second SRS resource set.

In one embodiment, steps marked by the box F56 and the box F58 in FIG. 5 exist; the second node U1 receives an SRS in the first SRS resource set, and receives an SRS in the second SRS resource set.

In one embodiment, the step marked by the box F56 in FIG. 5 exists, while the step marked by the box F58 in FIG. 5 does not exist; the second node U1 receives an SRS in only the first SRS resource set of the first SRS resource set and the second SRS resource set.

In one embodiment, the step marked by the box F56 in FIG. 5 does not exist, while the step marked by the box F58 in FIG. 5 exists; the second node U1 receives an SRS in only the second SRS resource set of the first SRS resource set and the second SRS resource set.

In one embodiment, the step marked by the box F59 in FIG. 5 exists; the first signaling is used by the first node U2 to determine the first RE set and the second RE set; herein, the first RE set and the second RE set are respectively reserved for the first sub-signal and the second sub-signal; the first signaling indicates that the first RE set is associated with the first SRS resource set, and the first signaling indicates that the second RE set is associated with the second SRS resource set; the first TA and the first RE set are used by the first node U2 to determine the first time window, while the second TA and the second RE set are used by the first node U2 to determine the second time window; the first time window and the second time window are overlapping, the third time window comprising the overlap between the first time window and the second time window; the first node U2 drops transmitting a part of the first sub-signal that is located within the third time window, or, the first node U2 drops transmitting a part of the second sub-signal that is located within the third time window; or, the first node U2 drops transmitting a part of the first sub-signal that is located within the third time window and a part of the second sub-signal that is located within the third time window.

In one embodiment, the first signaling is transmitted in a downlink physical layer control channel (i.e., a downlink channel only capable of bearing physical layer signaling).

In one embodiment, the first signaling is transmitted in a Physical Downlink Control Channel (PDCCH).

In one embodiment, the first signaling is transmitted in a downlink physical layer data channel (i.e., a downlink channel only capable of bearing physical layer data).

In one embodiment, the first signaling is transmitted in a Physical Downlink Shared CHannel (PDSCH).

In one embodiment, the step marked by the box F510 in FIG. 5 exists; the first signaling comprises scheduling information of the first signal, the first signal comprising a part of at least one of the first sub-signal or the second sub-signal that does not belong to the third time window.

In one embodiment, scheduling information of the first signal comprises scheduling information of the first sub-signal and scheduling information of the second sub-signal.

In one embodiment, the scheduling information comprises one or more of time-domain resources, frequency-domain resources, a Modulation and Coding Scheme (MCS), a DeModulation Reference Signal (DMRS) port, a Hybrid Automatic Repeat request (HARQ) process number, a Redundancy version (RV), a New data indicator (NDI), a Transmission Configuration Indicator (TCI) state or a Sounding reference signal Resource Indicator (SRI).

In one embodiment, the first signal comprises a part of the first sub-signal being transmitted in the first RE set that does not belong to the third time window, as well as the second sub-signal being transmitted in the second RE set.

In one subembodiment, the first signal does not comprise a part of the first sub-signal that is located in the third time window.

In one subembodiment, the first signal comprises a part of the second sub-signal that is located in the third time window.

In one embodiment, the first signal comprises the first sub-signal being transmitted in the first RE set, as well as a part of the second sub-signal being transmitted in the second RE set that does not belong to the third time window.

In one subembodiment, the first signal does not comprise a part of the second sub-signal that is located in the third time window.

In one subembodiment, the first signal comprises a part of the first sub-signal that is located in the third time window.

In one embodiment, the first signal comprises a part of the first sub-signal being transmitted in the first RE set that does not belong to the third time window, as well as a part of the second sub-signal being transmitted in the second RE set that does not belong to the third time window.

In one subembodiment, the first signal does not comprise a part of the first sub-signal being located in the third time window, nor does it comprise a part of the second sub-signal being located in the third time window.

In one embodiment, the first node drops transmitting the second sub-signal.

In one subembodiment, the first signal comprises the first sub-signal being transmitted in the first RE set.

In one subembodiment, the first signal does not comprise the second sub-signal.

In one subembodiment, when and only when a length of the third time window is greater than a second threshold, the first node drops transmitting the second signal.

In one embodiment, the first node drops transmitting the first sub-signal.

In one subembodiment, the first signal comprises the second sub-signal being transmitted in the second RE set.

In one subembodiment, the first signal does not comprise the first sub-signal.

In one subembodiment, when and only when a length of the third time window is greater than a second threshold, the first node drops transmitting the first sub-signal.

In one embodiment, the second threshold is a non-negative real number.

In one embodiment, the second threshold is a positive real number.

In one embodiment, the second threshold is equal to 0.

In one embodiment, the second threshold is greater than 0.

In one embodiment, the second threshold is configurable.
In one embodiment, the second threshold is default.

In one embodiment, the transmitter transmitting the first information block is the target receiver receiving the first signaling.

In one embodiment, the first signal is transmitted in an uplink physical layer data channel (i.e., an uplink channel capable of bearing physical layer data).

In one embodiment, the first sub-signal and the second sub-signal correspond to a same HARQ process number.

In one embodiment, the first sub-signal and the second sub-signal correspond to a same MCS.

In one embodiment, the first sub-signal and the second sub-signal correspond to a same NDI.

In one embodiment, the first sub-signal and the second sub-signal correspond to a same RV.

In one embodiment, the first sub-signal and the second sub-signal correspond to different RVs.

In one embodiment, the first sub-signal and the second sub-signal correspond to a same subcarrier spacing.

In one embodiment, the first signal is transmitted in a PUSCH.

Embodiment 6

Embodiment 6 illustrates a schematic diagram of a first SRS resource set corresponding to a first TA and a second SRS resource set corresponding to a second TA according to one embodiment of the present application; as shown in FIG. 6.

In one embodiment, the first SRS resource set and the second SRS resource set respectively comprise at least one Sounding Reference Signal (SRS) resource; any SRS resource in the first SRS resource set comprises at least one SRS port, while any SRS resource in the second SRS resource set comprises at least one SRS port.

In one embodiment, a higher-layer parameter "usage" associated with the first SRS resource set and a higher-layer parameter "usage" associated with the second SRS resource set are both configured as "codebook" or "nonCodebook".

In one embodiment, the first SRS resource set is identified by an SRS-ResourceSetId, while the second SRS resource set is identified by an SRS-ResourceSetId; an SRS-ResourceSetId of the first SRS resource set is unequal to an SRS-ResourceSetId of the second SRS resource set.

In one embodiment, an SRS-ResourceSetId of the first SRS resource set is smaller than an SRS-ResourceSetId of the second SRS resource set.

In one embodiment, an SRS-ResourceSetId of the first SRS resource set is larger than an SRS-ResourceSetId of the second SRS resource set.

In one embodiment, the first SRS resource set and the second SRS resource set are respectively configured by a first higher layer parameter, where the name of the first higher layer parameter includes "srs-ResourceSet".

In one subembodiment, the name of the first higher layer parameter includes "srs-ResourceSetToAddModList".

In one subembodiment, the first SRS resource set and the second SRS resource set are configured by the same said first higher layer parameter.

In one embodiment, any SRS resource in the first SRS resource set is identified by an SRS-ResourceId, while any SRS resource in the second SRS resource set is identified by an SRS-ResourceId.

In one embodiment, any two SRS resources in the first SRS resource set have equal numbers of SRS ports.

In one embodiment, there are two SRS resources in the first SRS resource set having unequal numbers of SRS ports.

In one embodiment, any two SRS resources in the second SRS resource set have equal numbers of SRS ports.

In one embodiment, there are two SRS resources in the second SRS resource set having unequal numbers of SRS ports.

In one embodiment, a number of SRS ports of any SRS resource in the first SRS resource set is equal to a number of SRS ports of any SRS resource in the second SRS resource set.

In one embodiment, there is one SRS resource in the first SRS resource set having an unequal number of SRS ports compared with those of any SRS resource in the second SRS resource set.

In one embodiment, a number of SRS ports of any SRS resource in the first SRS resource set is unequal to a number of SRS ports of any SRS resource in the second SRS resource set.

In one embodiment, a number of SRS resources comprised in the first SRS resource set is equal to a number of SRS resources comprised in the second SRS resource set.

In one embodiment, a number of SRS resources comprised in the first SRS resource set is unequal to a number of SRS resources comprised in the second SRS resource set.

In one embodiment, the definition of the SRS-Resource-SetId can be found in 3GPP TS38.331.

In one embodiment, the definition of the SRS-ResourceId can be found in 3GPP TS38.331.

Typically, the first SRS resource set and the second SRS resource set belong to a same BWP in a same cell.

Typically, the first SRS resource set and the second SRS resource set belong to a same Carrier in a same cell.

In one embodiment, configuration information of the first SRS resource set and configuration information of the second SRS resource set are configured by the same cell.

In one embodiment, the configuration information comprises one or more of occupied frequency-domain resources, occupied time-domain resources, a position of a first symbol occupied in a belonging time unit, a number of symbols occupied in a belonging time unit, occupied code-domain resources, an RS sequence, a number of SRS ports, a number of repetitions, a spatial relation or a time-domain behavior.

In one subembodiment, the time-domain behavior includes periodic, semi-persistent or aperiodic.

Typically, the sentence of the first SRS resource set corresponding to a first TA and the second SRS resource set corresponding to a second TA includes a meaning that: when the first node transmits a signal using the same antenna ports as SRS ports of at least one SRS resource in the first SRS resource set, the first TA is used to determine a timing advance between a downlink and an uplink; when the first node transmits a signal using the same antenna ports as SRS ports of at least one SRS resource in the second SRS resource set, the second TA is used to determine a timing advance between a downlink and an uplink.

In one embodiment, when the first node transmits a signal using the same antenna ports as SRS ports of at least one SRS resource in the first SRS resource set, a timing advance between a downlink and an uplink is equal to the first TA; when the first node transmits a signal using the same antenna ports as SRS ports of at least one SRS resource in the second SRS resource set, a timing advance between a downlink and an uplink is equal to the second TA.

In one embodiment, when the first node transmits a signal using the same antenna ports as SRS ports of at least one SRS resource in the first SRS resource set, a timing advance between a downlink and an uplink is equal to a sum of the first TA and a first offset; when the first node transmits a signal using the same antenna ports as SRS ports of at least one SRS resource in the second SRS resource set, a timing advance between a downlink and an uplink is equal to a sum of the second TA and a second offset.

In one embodiment, when the first node transmits a signal using the same antenna ports as SRS ports of at least one SRS resource in the first SRS resource set, a timing advance between a downlink and an uplink is equal to a product of the first TA and Tc; when the first node transmits a signal using the same antenna ports as SRS ports of at least one SRS resource in the second SRS resource set, a timing advance between a downlink and an uplink is equal to a product of the second TA and Tc; the Tc is a basic time unit.

In one embodiment, when the first node transmits a signal using the same antenna ports as SRS ports of at least one SRS resource in the first SRS resource set, a timing advance between a downlink and an uplink is equal to a product of Tc and a sum of the first TA and a first offset; when the first node transmits a signal using the same antenna ports as SRS ports of at least one SRS resource in the second SRS resource set, a timing advance between a downlink and an uplink is equal to a product of Tc and a sum of the second TA and a second offset; the Tc is a basic time unit.

In one embodiment, when the first node transmits a signal using the same antenna ports as SRS ports of at least one SRS resource in the first SRS resource set, a timing advance between a downlink and an uplink is unrelated to the second TA; when the first node transmits a signal using the same antenna ports as SRS ports of at least one SRS resource in the second SRS resource set, a timing advance between a downlink and an uplink is unrelated to the first TA.

In one embodiment, the first offset and the second offset are respectively timing advance offsets.

Embodiment 7

Figure 7:
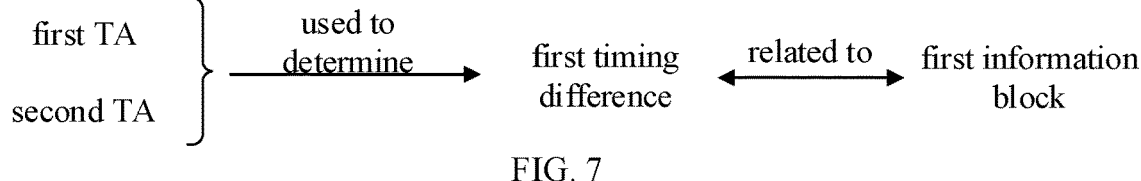
FIG. 7 illustrates a schematic diagram of relations among a first TA, a second TA, a first timing difference and a first information block according to one embodiment of the present application.

Embodiment 7 illustrates a schematic diagram of relations among a first TA, a second TA, a first timing difference and a first information block according to one embodiment of the present application; as shown in FIG. 7. In Embodiment 7, the first TA and the second TA are used by the first node to determine the first timing difference, the first information block being related to the first timing difference.

In one embodiment, the first timing difference is a real number.

In one embodiment, the first timing difference is measured in Tc, where the Tc is a basic time unit.

In one embodiment, the first timing difference is measured in milliseconds (ms).

In one embodiment, the first timing difference is measured in seconds (s).

In one embodiment, the first timing difference is equal to a difference between the first TA and the second TA.

In one embodiment, the first timing difference is a difference between two uplink timings.

In one subembodiment, the two uplink timings are for a same cell.

In one subembodiment, the two uplink timings are for a same BWP.

In one subembodiment, the two uplink timings are for a same carrier.

In one embodiment, when the first node transmits a signal in an uplink frame using the same antenna ports as SRS ports of at least one SRS resource in the first SRS resource set, a start time of the uplink frame is a first reference time; when the first node transmits a signal in the uplink frame using the same antenna ports as SRS ports of at least one SRS resource in the second SRS resource set, a start time of the uplink frame is a second reference time; a time interval between the first reference time and the second reference time is used to determine the first timing difference.

In one subembodiment, the first timing difference is equal to a time interval between the first reference time and the second reference time.

In one subembodiment, the first timing difference is equal to a time interval measured in Tc between the first reference time and the second reference time; the Tc is a basic time unit.

In one subembodiment, the first TA is used to determine the first reference time, while the second TA is used to determine the second reference time.

In one embodiment, the first timing difference is equal to a difference between an uplink timing when the first node transmits a signal using the same antenna ports as SRS ports of at least one SRS resource in the first SRS resource set and an uplink timing when the first node transmits a signal using the same antenna ports as SRS ports of at least one SRS resource in the second SRS resource set.

In one subembodiment, the first TA is used to determine the uplink timing when the first node transmits a signal using the same antenna ports as SRS ports of at least one SRS resource in the first SRS resource set, while the second TA is used to determine the uplink timing when the first node transmits a signal using the same antenna ports as SRS ports of at least one SRS resource in the second SRS resource set.

In one embodiment, the first TA is used to determine a first uplink timing, while the second TA is used to determine a second uplink timing; the first timing difference is equal to a difference between the first uplink timing and the second uplink timing.

In one subembodiment, the first timing difference is equal to a difference measured in Tc between the first uplink timing and the second uplink timing; the Tc is a basic time unit.

In one embodiment, the first uplink timing and the second uplink timing are for a same cell.

In one embodiment, the first uplink timing and the second uplink timing are for a same BWP.

In one embodiment, the first uplink timing and the second uplink timing are for a same Carrier.

In one embodiment, the first uplink timing and the second uplink timing are applied in a same cell.

In one embodiment, the first uplink timing and the second uplink timing are applied in a same BWP.

In one embodiment, the first uplink timing and the second uplink timing are applied in a same Carrier.

In one embodiment, the first timing difference is used to determine the first information block.

In one embodiment, the first timing difference is used to determine what is contained in the first information block.

In one embodiment, the first timing difference is used to determine whether the first information block is to be transmitted.

In one embodiment, the first timing difference is used to determine that the first information block is transmitted.

In one embodiment, the first information block comprises the first timing difference.

In one embodiment, the first information block indicates the first timing difference.

In one embodiment, the first information block comprises an absolute value of the first timing difference.

In one embodiment, the first information block indicates an absolute value of the first timing difference.

In one embodiment, the first information block is used to indicate whether the first timing difference is greater than a first threshold.

In one embodiment, the first information block is used to indicate whether an absolute value of the first timing difference is greater than a first threshold.

In one embodiment, the first information block is used to indicate whether the first timing difference is greater than or equal to a first threshold.

In one embodiment, the first information block is used to indicate whether an absolute value of the first timing difference is greater than or equal to a first threshold.

In one embodiment, the first information block is used to indicate that the first timing difference is greater than a first threshold.

In one embodiment, the first information block is used to indicate that an absolute value of the first timing difference is greater than a first threshold.

In one embodiment, the first information block is used to indicate that the first timing difference is greater than or equal to a first threshold.

In one embodiment, the first information block is used to indicate that an absolute value of the first timing difference is greater than or equal to a first threshold.

In one embodiment, the first threshold is a non-negative real number.

In one embodiment, the first threshold is a positive real number.

In one embodiment, the first threshold is equal to 0.

In one embodiment, the first threshold is greater than 0.

In one embodiment, the first threshold is configurable.

In one embodiment, the first threshold is configured by a higher layer signaling.

In one embodiment, the first threshold is configured by an RRC signaling.

In one embodiment, the first threshold is configured by a MAC CE.

In one embodiment, the first threshold is not in need of configuration.

In one embodiment, the first threshold is fixed.

In one embodiment, the first threshold is related to capability of the first node.

In one embodiment, the first information block is used to indicate whether the first timing difference is greater than 0.

In one embodiment, the first information block is used to indicate that the first timing difference is greater than 0.

In one embodiment, the first information block is used to indicate whether the first timing difference is less than 0.

In one embodiment, the first information block is used to indicate that the first timing difference is less than 0.

Embodiment 8

Figure 8:
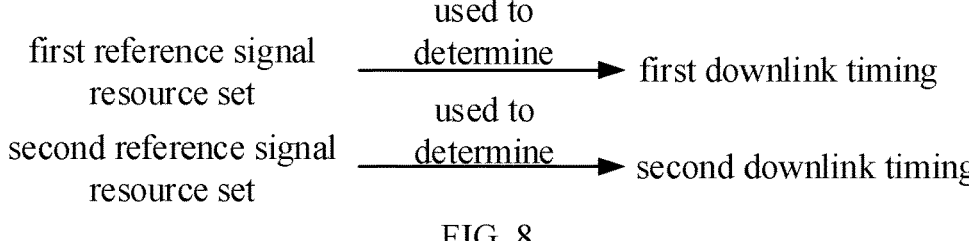
FIG. 8 illustrates a schematic diagram of a first reference signal resource set being used to determine a first downlink timing and a second reference signal resource set being used to determine a second downlink timing according to one embodiment of the present application.

Embodiment 8 illustrates a schematic diagram of a first reference signal resource set being used to determine a first downlink timing and a second reference signal resource set being used to determine a second downlink timing according to one embodiment of the present application; as shown in FIG. 8.

In one embodiment, the first reference signal resource set is used by the first node to determine the first downlink timing, while the second reference signal resource set is used by the first node to determine the second downlink timing.

In one embodiment, a reception for a reference signal in the first reference signal resource set is used to determine the first downlink timing, while a reception for a reference signal in the second reference signal resource set is used to determine the second downlink timing.

In one embodiment, the first downlink timing is a downlink timing determined according to a reception for a reference signal in the first reference signal resource set, while the second downlink timing is a downlink timing determined according to a reception for a reference signal in the second reference signal resource set.

In one embodiment, a first path being detected in time domain for a reference signal transmitted in the first reference signal resource set is used to determine the first downlink timing, and a first path being detected in time domain for a reference signal transmitted in the second reference signal resource set is used to determine the second downlink timing.

In one embodiment, a first path being detected in time domain for a downlink frame to which the first reference signal resource set belongs is used to determine the first downlink timing, while a first path being detected in time domain for a downlink frame to which the second reference signal resource set belongs is used to determine the second downlink timing.

In one embodiment, the first downlink timing and the second downlink timing are respectively start times of downlink frames.

In one embodiment, the first downlink timing and the second downlink timing are respectively used to determine start times of downlink frames.

In one embodiment, the first downlink timing is a start time of a downlink frame determined according to a reception for a reference signal in the first reference signal resource set, while the second downlink timing is a start time of a downlink frame determined according to a reception for a reference signal in the second reference signal resource set.

In one embodiment, the first downlink timing and the second downlink timing are for a same cell.

In one embodiment, the first downlink timing and the second downlink timing are for a same BWP.

In one embodiment, the first downlink timing and the second downlink timing are for a same Carrier.

Typically, the first reference signal resource comprises Synchronisation Signal/physical broadcast channel Block (SS/PBCH block) resources.

Typically, any reference signal resource in the first reference signal resource set comprises an SS/PBCH block resource.

Typically, any reference signal resource in the first reference signal resource set is an SS/PBCH block resource.

In one embodiment, the first reference signal resource set comprises a Channel State Information-Reference Signal (CSI-RS) resource.

In one embodiment, any reference signal resource in the first reference signal resource set comprises one CSI-RS resource.

In one embodiment, the first reference signal resource set is periodic.

Typically, the second reference signal resource set comprises SS/PBCH block resources.

Typically, any reference signal resource in the second reference signal resource set comprises an SS/PBCH block resource.

Typically, any reference signal resource in the second reference signal resource set is an SS/PBCH block resource.

In one embodiment, the second reference signal resource set comprises CSI-RS resources.

In one embodiment, any reference signal resource in the second reference signal resource set comprises one CSI-RS resource.

In one embodiment, the second reference signal resource set is periodic.

In one embodiment, the first reference signal resource set only comprises one reference signal resource.

In one embodiment, the first reference signal resource set only comprises one SS/PBCH block resource.

In one embodiment, the first reference signal resource set comprises multiple reference signal resources.

In one embodiment, the first reference signal resource set comprises multiple SS/PBCH block resources.

In one embodiment, the second reference signal resource set only comprises one reference signal resource.

In one embodiment, the second reference signal resource set only comprises one SS/PBCH block resource.

In one embodiment, the second reference signal resource set comprises multiple reference signal resources.

In one embodiment, the second reference signal resource set comprises multiple SS/PBCH block resources.

In one embodiment, a reference signal transmitted in any reference signal resource in the first reference signal resource set comprises an SS/PBCH block.

In one embodiment, a reference signal transmitted in any reference signal resource in the first reference signal resource set is an SS/PBCH block.

In one embodiment, a reference signal transmitted in any reference signal resource in the second reference signal resource set comprises an SS/PBCH block.

In one embodiment, a reference signal transmitted in any reference signal resource in the second reference signal resource set is an SS/PBCH block.

In one embodiment, any reference signal resource in the first reference signal resource set is identified by an SS/PBCH block index.

In one embodiment, any reference signal resource in the second reference signal resource set is identified by an SS/PBCH block index.

Typically, any reference signal resource in the first reference signal resource set is identified by an SS/PBCH block index, while any reference signal resource in the second reference signal resource set is identified by an SS/PBCH block index, where an SS/PBCH block index of any reference signal resource in the first reference signal resource set and an SS/PBCH block index of any reference signal resource in the second reference signal resource set are unequal.

In one embodiment, any reference signal resource in the first reference signal resource set and any reference signal resource in the second reference signal resource set cannot be assumed to be quasi co-located.

In one embodiment, any reference signal resource in the first reference signal resource set and any reference signal resource in the second reference signal resource set cannot be assumed to be quasi co-located in terms of a delay spread, a Doppler spread, a Doppler shift, an average delay, an average gain and Spatial Rx parameters.

In one embodiment, the first reference signal resource set and the second reference signal resource set respectively belong to different TAGs.

In one embodiment, reference signals in the first reference signal resource set and reference signals in the second reference signal resource set are transmitted in a same cell.

In one embodiment, reference signals in the first reference signal resource set and reference signals in the second reference signal resource set are transmitted in a same BWP.

In one embodiment, reference signals in the first reference signal resource set and reference signals in the second reference signal resource set are transmitted in a same carrier.

In one embodiment, a same Physical Cell Identity (PCI) is used for generating a reference signal in any reference signal resource in the first reference signal resource set and a reference signal in any reference signal resource in the second reference signal resource set.

In one embodiment, a same PCI is used for generating a reference signal (RS) sequence of a reference signal in any reference signal resource in the first reference signal resource set and an RS sequence of a reference signal in any reference signal resource in the second reference signal resource set.

In one embodiment, reference signals in the first reference signal resource set and reference signals in the second reference signal resource set are transmitted in different cells.

In one embodiment, a first reference signal is a reference signal in a reference signal resource in the first reference signal resource set, and a second reference signal is a reference signal in a reference signal resource in the first reference signal resource set; different PCIs are used for generating an RS sequence of the first reference signal and an RS sequence of the second reference signal.

In one subembodiment, the first reference signal is a reference signal in any reference signal resource in the first reference signal resource set, while the second reference signal is a reference signal in any reference signal resource in the second reference signal resource set.

Typically, the first SRS resource set is associated with the first reference signal resource set, while the second SRS resource set is associated with the second reference signal resource set.

Typically, a spatial relation of any SRS resource in the first SRS resource set is determined by a reference signal resource in the first reference signal resource set, while a spatial relation of any SRS resource in the second SRS resource set is determined by a reference signal resource in the second reference signal resource set.

In one embodiment, a first given SRS resource is any SRS resource in the first SRS resource set, while a second given SRS resource is any SRS resource in the second SRS resource set; the first node transmits an SRS in the first given SRS resource using a same spatial domain filter as that used for receiving a reference signal in a reference signal resource in the first reference signal resource set; the first node transmits an SRS in the second given SRS resource using a same spatial domain filter as that used for receiving a reference signal in a reference signal resource in the first reference signal resource set.

In one embodiment, a Transmission Configuration Indicator (TCI) state of any SRS resource in the first SRS resource set indicates a reference signal resource in the first reference signal resource set, or indicates a reference signal resource that is quasi-co-located with a reference signal resource in the first reference signal resource set; a TCI state of any SRS resource in the second SRS resource set indicates a reference signal resource in the second reference signal resource set, or indicates a reference signal resource that is quasi-co-located with a reference signal resource in the second reference signal resource set.

In one embodiment, a spatial relation of any SRS resource in the first SRS resource set indicates a reference signal resource in the first reference signal resource set, or indicates a reference signal resource that is quasi-co-located with a reference signal resource in the first reference signal resource set; a spatial relation of any SRS resource in the second SRS resource set indicates a reference signal resource in the second reference signal resource set, or indicates a reference signal resource that is quasi-co-located with a reference signal resource in the second reference signal resource set.

Embodiment 9

Figure 9:
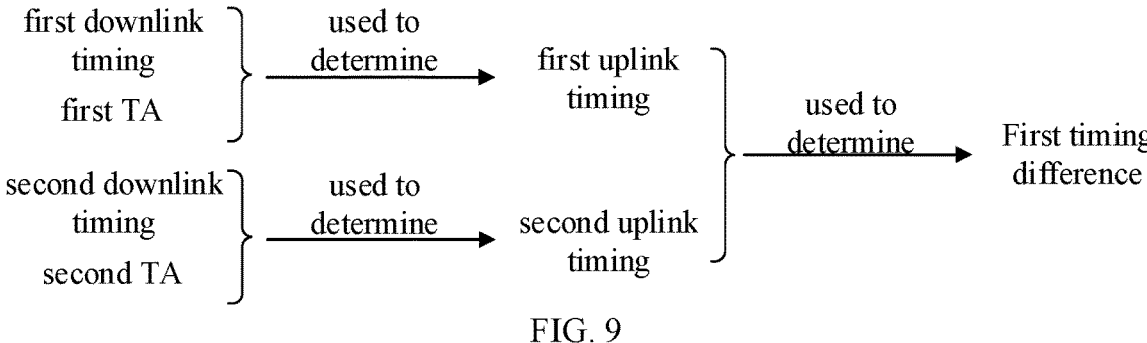
FIG. 9 illustrates a schematic diagram of relations among a first downlink timing, a first TA, a first uplink timing, a second downlink timing, a second TA, a second uplink timing and a first timing difference according to one embodiment of the present application.

Embodiment 9 illustrates a schematic diagram of relations among a first downlink timing, a first TA, a first uplink timing, a second downlink timing, a second TA, a second uplink timing and a first timing difference according to one embodiment of the present application; as shown in FIG. 9. In Embodiment 9, the first downlink timing and the first TA are used by the first node to determine the first uplink timing, while the second downlink timing and the second TA are used by the first node to determine the second uplink timing; the first uplink timing and the second uplink timing are used by the first node to determine the first timing difference.

In one embodiment, the first uplink timing and the second uplink timing are respectively start times of uplink frames.

In one embodiment, the first uplink timing and the second uplink timing are respectively used to determine start times of uplink frames.

In one embodiment, the first uplink timing is earlier than the first downlink timing by the first TA; the second uplink timing is earlier than the second downlink timing by the second TA.

In one embodiment, the first uplink timing is earlier than the first downlink timing by a sum of the first TA and a first offset; the second uplink timing is earlier than the second downlink timing by a sum of the second TA and a second offset.

In one embodiment, the first uplink timing is used to determine a start time of an uplink frame transmitted by the first node; the second uplink timing is used to determine a start time of an uplink frame transmitted by the first node.

In one embodiment, the first TA is used to determine an advance of a start time of an uplink frame transmitted by the first node relative to a start time of a downlink frame corresponding to the uplink frame, while the second TA is used to determine an advance of a start time of an uplink frame transmitted by the first node relative to a start time of a downlink frame corresponding to the downlink frame.

In one embodiment, the first TA is used to determine an advance of a start time of an uplink frame transmitted by the first node relative to a reception of a first path being detected in time domain for a downlink frame corresponding to the uplink frame, while the second TA is used to determine an advance of a start time of an uplink frame transmitted by the first node relative to a reception of a first path being detected in time domain for a downlink frame corresponding to the downlink frame.

In one embodiment, the first downlink timing is used to determine a start time of the downlink frame corresponding to the uplink frame, while the second downlink timing is used to determine a start time of the downlink frame corresponding to the uplink frame.

In one embodiment, the first downlink timing is used to determine a position of a first path being detected in time domain for the downlink frame corresponding to the uplink frame, while the second downlink timing is used to determine a position of a first path being detected in time domain for the downlink frame corresponding to the uplink frame.

In one embodiment, the first timing difference is a difference between two uplink timings.

In one embodiment, the first timing difference is a time interval between a start time of an uplink frame that the first uplink timing is used to determine and a start time of an uplink frame that the second uplink timing is used to determine.

In one embodiment, when the first uplink timing is used to determine an uplink timing of an uplink frame, a start time of the uplink frame is a first reference time, when the second uplink timing is used to determine an uplink timing of the uplink frame, a start time of the uplink frame is a second reference time, the first timing difference being a time interval between the first reference time and the second reference time.

Embodiment 10

Figure 10:
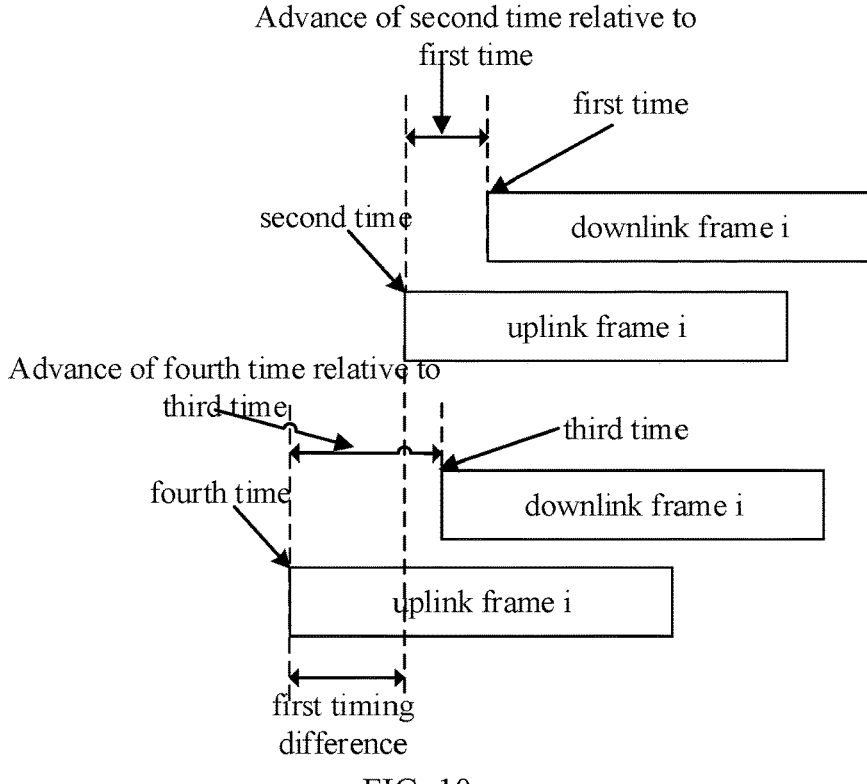
FIG. 10 illustrates a schematic diagram of relations among a first downlink timing, a first TA, a first uplink timing, a second downlink timing, a second TA, a second uplink timing and a first timing difference according to one embodiment of the present application.

Embodiment 10 illustrates a schematic diagram of relations among a first downlink timing, a first TA, a first uplink timing, a second downlink timing, a second TA, a second uplink timing and a first timing difference according to one embodiment of the present application; as shown in FIG. 10. In Embodiment 10, the first downlink timing is used to determine a first time, the first time being a start time of a downlink frame i; the first uplink timing is used to determine a second time, the second time being a start time of an uplink frame i; the first TA is used to determine an advance of the second time relative to the first time; the second downlink timing is used to determine a third time, the third time being a start time of a downlink frame i; the second uplink timing is used to determine a fourth time, the fourth time being a start time of an uplink frame i; the second TA is used to determine an advance of the fourth time relative to the third time; a time interval between the second time and the fourth time is used to determine the first timing difference; the downlink frame i shown in FIG. 10 is a downlink frame corresponding to an uplink frame i.

In one embodiment, the second time is a time when the first node starts to transmit the uplink frame i.

In one embodiment, the second time is a start time of the uplink frame i that the first node is going to transmit.

In one embodiment, the second time is a start time of the uplink frame i when the first node transmits a signal in the uplink frame i using the same antenna port as an SRS port of at least one SRS resource in the first SRS resource set.

In one embodiment, the second time is a start time of the uplink frame i when the first node is going to transmit a signal in the uplink frame i using the same antenna port as an SRS port of at least one SRS resource in the first SRS resource set.

In one embodiment, the fourth time is a time when the first node starts to transmit the uplink frame i.

In one embodiment, the fourth time is a start time of the uplink frame i that the first node is going to transmit.

In one embodiment, the fourth time is a start time of the uplink frame i when the first node transmits a signal in the uplink frame i using the same antenna port as an SRS port of at least one SRS resource in the second SRS resource set.

In one embodiment, the fourth time is a start time of the uplink frame i when the first node is going to transmit a signal in the uplink frame i using the same antenna port as an SRS port of at least one SRS resource in the second SRS resource set.

In one embodiment, the first time is a start time of the downlink frame i at the first node.

In one embodiment, the first time is a time when the first node starts to receive the downlink frame i.

In one embodiment, the first time is a time when the first node receives a first path for the downlink frame i being detected in time domain.

In one embodiment, the first time is a start time of a downlink frame corresponding to the uplink frame i at the first node when the first node transmits a signal in the uplink frame i using the same antenna port as an SRS port of at least one SRS resource in the first SRS resource set.

In one embodiment, the first time is a start time of a downlink frame corresponding to the uplink frame i at the first node when the first node is going to transmit a signal in the uplink frame i using the same antenna port as an SRS port of at least one SRS resource in the first SRS resource set.

In one embodiment, the first time is a start time of the downlink frame i at the first node when the first node receives the downlink frame i using a same spatial domain filter as that used for receiving a reference signal in at least one reference signal resource in the first reference signal resource set.

In one embodiment, the third time is a start time of the downlink frame i at the first node.

In one embodiment, the third time is a time when the first node starts to receive the downlink frame i.

In one embodiment, the third time is a time when the first node receives a first path for the downlink frame i being detected in time domain.

In one embodiment, the third time is a start time of a downlink frame corresponding to the uplink frame i at the first node when the first node transmits a signal in the uplink frame i using the same antenna port as an SRS port of at least one SRS resource in the second SRS resource set.

In one embodiment, the third time is a start time of a downlink frame corresponding to the uplink frame i at the first node when the first node is going to transmit a signal in the uplink frame i using the same antenna port as an SRS port of at least one SRS resource in the second SRS resource set.

In one embodiment, the third time is a start time of the downlink frame i at the first node when the first node receives the downlink frame i using a same spatial domain filter as that used for receiving a reference signal in at least one reference signal resource in the second reference signal resource set.

In one embodiment, the advance of the second time relative to the first time is an advance of a start time of the uplink frame i relative to a start time of the downlink frame i at the first node when the first node transmits a signal in the uplink frame i using the same antenna port as an SRS port of at least one SRS resource in the first SRS resource set.

In one embodiment, the advance of the fourth time relative to the third time is an advance of a start time of the uplink frame i relative to a start time of the downlink frame i at the first node when the first node transmits a signal in the uplink frame i using the same antenna port as an SRS port of at least one SRS resource in the second SRS resource set.

In one embodiment, the advance of the second time relative to the first time is an advance of a start time of the uplink frame i relative to a start time of the downlink frame i at the first node when the first node is going to transmit a signal in the uplink frame i using the same antenna port as an SRS port of at least one SRS resource in the first SRS resource set.

In one embodiment, the advance of the fourth time relative to the third time is an advance of a start time of the uplink frame i relative to a start time of the downlink frame i at the first node when the first node is going to transmit a signal in the uplink frame i using the same antenna port as an SRS port of at least one SRS resource in the second SRS resource set.

In one embodiment, the advance of the second time relative to the first time is an advance of a start time of the uplink frame i relative to a reception of a first path being detected in time domain for a downlink frame corresponding to the uplink frame i when the first node transmits a signal in the uplink frame i using the same antenna port as an SRS port of at least one SRS resource in the first SRS resource set.

In one embodiment, the advance of the fourth time relative to the third time is an advance of a start time of the uplink frame i relative to a reception of a first path being detected in time domain for a downlink frame corresponding to the uplink frame i when the first node transmits a signal in the uplink frame i using the same antenna port as an SRS port of at least one SRS resource in the second SRS resource set.

In one embodiment, the advance of the second time relative to the first time is an advance of a start time of the uplink frame i relative to a reception of a first path being detected in time domain for a downlink frame corresponding to the uplink frame i when the first node is going to transmit a signal in the uplink frame i using the same antenna port as an SRS port of at least one SRS resource in the first SRS resource set.

In one embodiment, the advance of the fourth time relative to the third time is an advance of a start time of the uplink frame i relative to a reception of a first path being detected in time domain for a downlink frame corresponding to the uplink frame i when the first node is going to transmit a signal in the uplink frame i using the same antenna port as an SRS port of at least one SRS resource in the second SRS resource set.

In one embodiment, the advance of the second time relative to the first time is equal to the first timing advance (TA).

In one embodiment, the advance of the second time relative to the first time is equal to a sum of the first TA and a first offset.

In one embodiment, the advance of the second time relative to the first time is equal to a product of the first TA and Tc, where the Tc is a basic time unit.

In one embodiment, the advance of the second time relative to the first time is equal to a product of Tc and a sum of the first TA and a first offset, where the Tc is a basic time unit.

In one embodiment, the advance of the fourth time relative to the third time is equal to the second timing advance (TA).

In one embodiment, the advance of the fourth time relative to the third time is equal to a sum of the second TA and a second offset.

In one embodiment, the advance of the fourth time relative to the third time is equal to a product of the second TA and Tc, where the Tc is a basic time unit.

In one embodiment, the advance of the fourth time relative to the third time is equal to a product of Tc and a sum of the second TA and a second offset, where the Tc is a basic time unit.

In one embodiment, the first timing difference is equal to a time interval between the second time and the fourth time.

In one embodiment, the first timing difference is equal to a time interval measured in Tc between the second time and the fourth time, where the Tc is a basic time unit.

In one embodiment, the first timing difference is equal to a time interval between the first uplink timing and the second uplink timing.

In one embodiment, the first timing difference is equal to a time interval measured in Tc between the first uplink timing and the second uplink timing, where the Tc is a basic time unit.

In one embodiment, when the first node transmits a signal in the uplink frame i using the same antenna port as an SRS port of at least one SRS resource in the first SRS resource set, the first uplink timing is used to determine a start time of the uplink frame i; when the first node transmits a signal in the uplink frame i using the same antenna port as an SRS port of at least one SRS resource in the second SRS resource set, the second uplink timing is used to determine a start time of the uplink frame i.

In one embodiment, when the first node is going to transmit a signal in the uplink frame i using the same antenna port as an SRS port of at least one SRS resource in the first SRS resource set, the first uplink timing is used to determine a start time of the uplink frame i; when the first node is going to transmit a signal in the uplink frame i using the same antenna port as an SRS port of at least one SRS resource in the second SRS resource set, the second uplink timing is used to determine a start time of the uplink frame i.

In one embodiment, when the first node transmits a signal in the uplink frame i using the same antenna port as an SRS port of at least one SRS resource in the first SRS resource set, the first downlink timing is used to determine a start time of a downlink frame corresponding to the uplink frame i at the first node; when the first node transmits a signal in the uplink frame i using the same antenna port as an SRS port of at least one SRS resource in the second SRS resource set, the second downlink timing is used to determine a start time of a downlink frame corresponding to the uplink frame i at the first node.

In one embodiment, when the first node is going to transmit a signal in the uplink frame i using the same antenna port as an SRS port of at least one SRS resource in the first SRS resource set, the first downlink timing is used to determine a start time of a downlink frame corresponding to the uplink frame i at the first node; when the first node is going to transmit a signal in the uplink frame i using the same antenna port as an SRS port of at least one SRS resource in the second SRS resource set, the second downlink timing is used to determine a start time of a downlink frame corresponding to the uplink frame i at the first node.

In one embodiment, when the first node transmits a signal in the uplink frame i using the same antenna port as an SRS port of at least one SRS resource in the first SRS resource set, the first TA is used to determine an advance of a start time of the uplink frame i relative to a start time of a downlink frame corresponding to the uplink frame i at the first node; when the first node transmits a signal in the uplink frame i using the same antenna port as an SRS port of at least one SRS resource in the second SRS resource set, the second TA is used to determine an advance of a start time of the uplink frame i relative to a start time of a downlink frame corresponding to the uplink frame i at the first node.

In one embodiment, when the first node transmits a signal in the uplink frame i using the same antenna port as an SRS port of at least one SRS resource in the first SRS resource set, the first TA is used to determine an advance of a start time of the uplink frame i relative to a reception of a first path being detected in time domain for a downlink frame corresponding to the uplink frame i; when the first node transmits a signal in the uplink frame i using the same antenna port as an SRS port of at least one SRS resource in the second SRS resource set, the second TA is used to determine an advance of a start time of the uplink frame i relative to a reception of a first path being detected in time domain for a downlink frame corresponding to the uplink frame i.

In one embodiment, when the first node is going to transmit a signal in the uplink frame i using the same antenna port as an SRS port of at least one SRS resource in the first SRS resource set, the first TA is used to determine an advance of a start time of the uplink frame i relative to a start time of a downlink frame corresponding to the uplink frame i at the first node; when the first node is going to transmit a signal in the uplink frame i using the same antenna port as an SRS port of at least one SRS resource in the second SRS resource set, the second TA is used to determine an advance of a start time of the uplink frame i relative to a start time of a downlink frame corresponding to the uplink frame i at the first node.

In one embodiment, when the first node is going to transmit a signal in the uplink frame i using the same antenna port as an SRS port of at least one SRS resource in the first SRS resource set, the first TA is used to determine an advance of a start time of the uplink frame i relative to a reception of a first path being detected in time domain for a downlink frame corresponding to the uplink frame i; when the first node is going to transmit a signal in the uplink frame i using the same antenna port as an SRS port of at least one SRS resource in the second SRS resource set, the second TA is used to determine an advance of a start time of the uplink frame i relative to a reception of a first path being detected in time domain for a downlink frame corresponding to the uplink frame i.

In one embodiment, the sentence that the first downlink timing and the first TA are used to determine a first uplink timing includes a meaning that: the first downlink timing is used to determine a start time of a downlink frame corresponding to the uplink frame i at the first node, and the first TA is used to determine an advance of a start time of the uplink frame i relative to a start time of the downlink frame corresponding to the uplink frame i at the first node.

In one embodiment, the sentence that the second downlink timing and the second TA are used to determine a second uplink timing includes a meaning that: the second downlink timing is used to determine a start time of a downlink frame corresponding to the uplink frame i at the first node, and the second TA is used to determine an advance of a start time of the uplink frame i relative to a start time of the downlink frame corresponding to the uplink frame i at the first node.

In one embodiment, the first timing difference is equal to a time interval between a start time of the uplink frame i when the first node transmits a signal in the uplink frame i using the same antenna port as an SRS port of at least one SRS resource in the first SRS resource set and a start time of the uplink frame i when the first node transmits a signal in the uplink frame i using the same antenna port as an SRS port of at least one SRS resource in the second SRS resource set.

In one embodiment, the first timing difference is equal to a time interval measured in Tc between a start time of the uplink frame i when the first node transmits a signal in the uplink frame i using the same antenna port as an SRS port of at least one SRS resource in the first SRS resource set and a start time of the uplink frame i when the first node transmits a signal in the uplink frame i using the same antenna port as an SRS port of at least one SRS resource in the second SRS resource set, where the Tc is a basic time unit.

In one embodiment, the first timing difference is equal to a time interval between a start time of the uplink frame i when the first node is going to transmit a signal in the uplink frame i using the same antenna port as an SRS port of at least one SRS resource in the first SRS resource set and a start time of the uplink frame i when the first node is going to transmit a signal in the uplink frame i using the same antenna port as an SRS port of at least one SRS resource in the second SRS resource set.

In one embodiment, the first timing difference is equal to a time interval measured in Tc between a start time of the uplink frame i when the first node is going to transmit a signal in the uplink frame i using the same antenna port as an SRS port of at least one SRS resource in the first SRS resource set and a start time of the uplink frame i when the first node is going to transmit a signal in the uplink frame i using the same antenna port as an SRS port of at least one SRS resource in the second SRS resource set, where the Tc is a basic time unit.

In one embodiment, when the first node transmits a signal in the uplink frame i using the same antenna port as an SRS port of at least one SRS resource in the first SRS resource set, a start time of the uplink frame i is the first uplink timing; when the first node transmits a signal in the uplink frame i using the same antenna port as an SRS port of at least one SRS resource in the second SRS resource set, a start time of the uplink frame i is the second uplink timing.

In one embodiment, when the first node transmits a signal in the uplink frame i using the same antenna port as an SRS port of at least one SRS resource in the first SRS resource set, a start time of a downlink frame corresponding to the uplink frame i at the first node is the first downlink timing; when the first node transmits a signal in the uplink frame i using the same antenna port as an SRS port of at least one SRS resource in the second SRS resource set, a start time of a downlink frame corresponding to the uplink frame i is the second downlink timing.

In one embodiment, when the first node receives a downlink frame using a same spatial domain filter as that used for receiving a reference signal in a reference signal resource in the first reference signal resource set, a start time of the downlink frame at the first node is the first downlink timing; when the first node receives a downlink frame using a same spatial domain filter as that used for receiving a reference signal in a reference signal resource in the second reference signal resource set, a start time of the downlink frame at the first node is the second downlink timing.

In one embodiment, when at least one antenna port of a downlink frame is quasi-co-located with a reference signal in the first reference signal resource set, the first downlink timing is used to determine a start time of the downlink frame at the first node; when at least one antenna port of a downlink frame is quasi-co-located with a reference signal in the second reference signal resource set, the second downlink timing is used to determine a start time of the downlink frame at the first node.

In one embodiment, when the first node receives a downlink frame using a same spatial domain filter as that used for receiving a reference signal in a reference signal resource in the first reference signal resource set, the first downlink timing is used to determine a start time of the downlink frame at the first node; when the first node receives a downlink frame using a same spatial domain filter as that used for receiving a reference signal in a reference signal resource in the second reference signal resource set, the second downlink timing is used to determine a start time of the downlink frame at the first node.

In one embodiment, when the first node is going to receive a downlink frame using a same spatial domain filter as that used for receiving a reference signal in a reference signal resource in the first reference signal resource set, the first downlink timing is used to determine a start time of the downlink frame at the first node; when the first node is going to receive a downlink frame using a same spatial domain filter as that used for receiving a reference signal in a reference signal resource in the second reference signal resource set, the second downlink timing is used to determine a start time of the downlink frame at the first node.

In one embodiment, the first offset and the second offset are respectively timing advance offsets.

In one embodiment, the first offset and the second offset are respectively real numbers.

In one embodiment, the first offset is configured by a higher layer parameter.

In one embodiment, names of a higher layer parameter configuring the first offset include "TimingAdvanceOffset".

In one embodiment, the first offset's value is default.

In one embodiment, the second offset is configured by a higher layer parameter.

In one embodiment, names of a higher layer parameter configuring the second offset include "TimingAdvanceOffset".

In one embodiment, the second offset's value is default.

Embodiment 11

Figure 11:
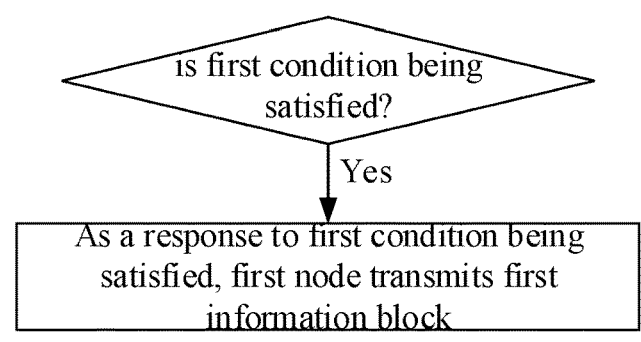
FIG. 11 illustrates a schematic diagram of a first node transmitting a first information block as a response to a first condition being satisfied according to one embodiment of the present application.

Embodiment 11 illustrates a schematic diagram of a first node transmitting a first information block as a response to a first condition being satisfied according to one embodiment of the present application; as shown in FIG. 11.

In one embodiment, the first timing difference is used by the first node to determine whether the first condition is satisfied.

In one embodiment, the first condition comprises: the first timing difference being greater than a first threshold.

In one embodiment, the first condition comprises: the first timing difference being greater than or equal to a first threshold.

In one embodiment, the first condition comprises: an absolute value of the first timing difference being greater than a first threshold.

In one embodiment, the first condition comprises: an absolute value of the first timing difference being greater than or equal to a first threshold.

In one embodiment, the first condition comprises: the first timing difference being greater than 0.

In one embodiment, the first condition comprises: the first timing difference being less than 0.

In one embodiment, the first condition only comprises: the first timing difference being greater than a first threshold.

In one embodiment, the first condition only comprises: the first timing difference being greater than or equal to a first threshold.

In one embodiment, the first condition only comprises: an absolute value of the first timing difference being greater than a first threshold.

In one embodiment, the first condition only comprises: an absolute value of the first timing difference being greater than or equal to a first threshold.

In one embodiment, the first condition only comprises: the first timing difference being greater than 0.

In one embodiment, the first condition only comprises: the first timing difference being less than 0.

In one embodiment, when the first timing difference is greater than a first threshold, the first condition is satisfied.

In one embodiment, when the first timing difference is greater than or equal to a first threshold, the first condition is satisfied.

In one embodiment, when an absolute value of the first timing difference is greater than a first threshold, the first condition is satisfied.

In one embodiment, when an absolute value of the first timing difference is greater than or equal to a first threshold, the first condition is satisfied.

In one embodiment, when the first timing difference is greater than 0, the first condition is satisfied.

In one embodiment, when the first timing difference is less than 0, the first condition is satisfied.

In one embodiment, the first threshold is a non-negative real number.

In one embodiment, the first threshold is a positive real number.

In one embodiment, the first threshold is equal to 0.

In one embodiment, the first threshold is greater than 0.

In one embodiment, the first threshold is configurable.

In one embodiment, the first threshold is configured by a higher layer signaling.

In one embodiment, the first threshold is not in need of configuration.

In one embodiment, the first threshold is fixed.

In one embodiment, the first threshold is related to capability of the first node.

In one embodiment, the sentence that as a response to the first condition being satisfied, the first node transmits the first information block includes a meaning that: along with the first condition being satisfied, the first node transmits the first information block.

In one embodiment, the sentence that as a response to the first condition being satisfied, the first node transmits the first information block includes a meaning that: when the first condition is satisfied, the first node transmits the first information block.

In one embodiment, when the first condition is not satisfied, the first node does not transmit the first information block.

Embodiment 12

Figure 12:
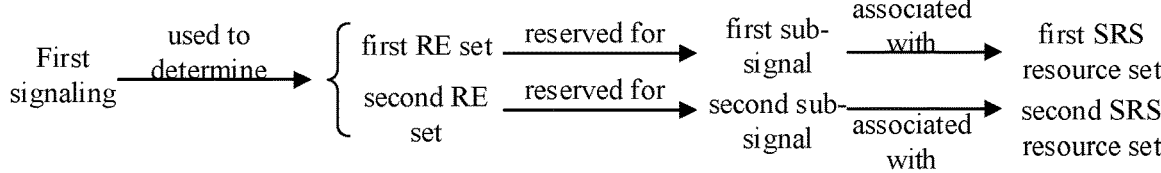
FIG. 12 illustrates a schematic diagram of a first signaling, a first RE set, a second RE set, a first sub-signal, a second sub-signal, a first SRS resource set and a second SRS resource set according to one embodiment of the present application.

Embodiment 12 illustrates a schematic diagram of a first signaling, a first RE set, a second RE set, a first sub-signal, a second sub-signal, a first SRS resource set and a second SRS resource set according to one embodiment of the present application; as shown in FIG. 12. In Embodiment 12, the first signaling is used by the first node to determine the first RE set and the second RE set; the first RE set and the second RE set are respectively reserved for the first sub-signal and the second sub-signal; the first signaling indicates that the first RE set is associated with the first SRS resource set, and the first signaling indicates that the second RE set is associated with the second SRS resource set.

In one embodiment, the first signaling comprises a physical-layer signaling.

In one embodiment, the first signaling comprises a layer 1 (L1) signaling.

Typically, the first signaling comprises Downlink Control Information (DCI).

Typically, the first signaling is a DCI.

In one embodiment, the first signaling comprises UpLink Grant DCI.

In one embodiment, the first signaling comprises DCI used for configured UpLink Grant scheduling activation.

In one embodiment, the first signaling comprises an RRC signaling.

In one embodiment, the first signaling comprises a MAC CE.

In one embodiment, the first signaling indicates the first RE set and the second RE set.

In one embodiment, the first signaling indicates frequency-domain resources occupied by the first RE set and frequency-domain resources occupied by the second RE set.

In one embodiment, the first signaling indicates time-domain resources occupied by the first RE set and time-domain resources occupied by the second RE set.

In one embodiment, the RE refers to Resource Element.

In one embodiment, the first RE set comprises multiple REs, and the second RE set comprises multiple REs.

In one embodiment, there isn't an RE belonging to the first RE set and the second RE set.

In one embodiment, the first RE set and the second RE set occupy different symbols.

In one embodiment, the symbol includes an Orthogonal Frequency Division Multiplexing (OFDM) Symbol.

In one embodiment, the symbol includes a Discrete Fourier Transform Spread OFDM (DFT-S-OFDM) symbol.

In one embodiment, the first RE set and the second RE set occupy different slots.

In one embodiment, the first RE set and the second RE set occupy different symbols in a same slot.

In one embodiment, the first RE set and the second RE set occupy different slots, where an index of the slot occupied by the first RE set is smaller than an index of the slot occupied by the second RE set.

In one embodiment, the first RE set and the second RE set occupy different symbols in a same slot, where an index of a first symbol occupied by the first RE set is smaller than an index of a first symbol occupied by the second RE set.

In one embodiment, the first RE set and the second RE set belong to a same Carrier.

In one embodiment, the first RE set and the second RE set belong to a same BWP.

In one embodiment, the first RE set and the second RE set belong to a same cell.

In one embodiment, the first sub-signal and the second sub-signal respectively comprise a baseband signal.

In one embodiment, the first sub-signal and the second sub-signal respectively comprise a radio signal.

In one embodiment, the first sub-signal and the second sub-signal respectively comprise a radio frequency (RF) signal.

In one embodiment, the first sub-signal and the second sub-signal respectively carry at least one Transport Block (TB).

In one embodiment, the first sub-signal and the second sub-signal carry a same TB.

In one embodiment, the first sub-signal and the second sub-signal comprise two repetitions of a same TB.

In one embodiment, the first sub-signal and the second sub-signal are transmitted in a same carrier.

In one embodiment, the first sub-signal and the second sub-signal are transmitted in a same BWP.

In one embodiment, the first sub-signal and the second sub-signal are transmitted in a same cell.

In one embodiment, the meaning of the sentence that an RE set is associated with an SRS resource set includes: at least one SRS resource in the SRS resource set is used to determine a transmission antenna port of a signal transmitted in the RE set.

In one embodiment, the meaning of the sentence that an RE set is associated with an SRS resource set includes: at least one SRS resource in the SRS resource set is used to determine a spatial domain filter of a signal transmitted in the RE set.

In one embodiment, the meaning of the sentence that an RE set is associated with an SRS resource set includes: at least one SRS resource in the SRS resource set is used to determine a precoder of a signal transmitted in the RE set.

In one embodiment, the meaning of the sentence that an RE set is associated with an SRS resource set includes: a signal transmitted in the RE set is transmitted by the same antenna port as an SRS port of at least one SRS resource in the SRS resource set.

In one embodiment, the meaning of the sentence that an RE set is associated with an SRS resource set includes: the first node transmits a signal in the RE set using the same antenna port as an SRS port of at least one SRS resource in the SRS resource set.

In one embodiment, the meaning of the sentence that an RE set is associated with an SRS resource set includes: an antenna port of a signal transmitted in the RE set is quasi co-located with an SRS port of at least one SRS resource in the SRS resource set.

In one embodiment, the meaning of the sentence that an RE set is associated with an SRS resource set includes: a DMRS port of a PUSCH in which a signal transmitted in the RE set is conveyed is quasi-co-located with an SRS port of at least one SRS resource in the SRS resource set.

In one embodiment, the meaning of the sentence that an RE set is associated with an SRS resource set includes: the first node uses a same spatial domain filter to transmit a signal in the RE set and transmit an SRS in at least one SRS resource in the SRS resource set.

In one embodiment, the meaning of the sentence that an RE set is associated with an SRS resource set includes: a precoder of a signal transmitted in the RE set and a precoder of an SRS in at least one SRS resource in the SRS resource set are the same.

In one embodiment, the first signaling comprises a first field, the first field in the first signaling indicating that the first RE set is associated with the first SRS resource set, and the first field in the first signaling indicating that the second RE set is associated with the second SRS resource set; names of the first field include "SRS resource set".

In one subembodiment, the first field is an "SRS resource set indication" field in DCI.

In one embodiment, the first node is configured with two SRS resource sets, and higher layer parameters "usage" associated with the two SRS resource sets are both configured as "codebook" or "nonCodebook"; when a value of the first field in the first signaling is equal to a first candidate value, the first SRS resource set is one of the two SRS resource sets that corresponds to a smaller SRS-Resource-SetId, while the second SRS resource set is the other of the two SRS resource sets that corresponds to a larger SRS-ResourceSetId; when a value of the first field in the first signaling is equal to a second candidate value, the first SRS resource set is one of the two SRS resource sets that corresponds to a larger SRS-ResourceSetId, while the second SRS resource set is the other of the two SRS resource sets that corresponds to a smaller SRS-ResourceSetId.

In one subembodiment, the first candidate value is equal to 2, and the second candidate value is equal to 3.

In one embodiment, the first signaling comprises a second field and a third field, the second field and the third field respectively indicating at least one SRI; the second field in the first signaling indicates a first SRS resource group, while the third field in the first signaling indicates a second SRS resource group; the first SRS resource group comprises at least one SRS resource in the first SRS resource set, while the second SRS resource group comprises at least one SRS resource in the second SRS resource set; the first SRS resource group is used to determine an antenna port for transmitting the first sub-signal, while the second SRS resource group is used to determine an antenna port for transmitting the second sub-signal; the second field is located before the third field in the first signaling.

In one subembodiment, the second field in the first signaling indicates an SRI of each SRS resource in the first SRS resource group, while the third field in the first signaling indicates an SRI of each SRS resource in the second SRS resource group.

Embodiment 13

Figure 13:
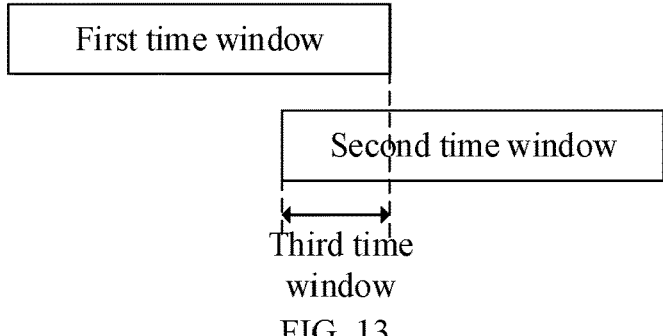
FIG. 13 illustrates a schematic diagram of a first time window, a second time window and a third time window according to one embodiment of the present application.

Embodiment 13 illustrates a schematic diagram of a first time window, a second time window and a third time window according to one embodiment of the present application; as shown in FIG. 13. In Embodiment 13, the first time window and the second time window are overlapping, the third time window comprising the overlap between the first time window and the second time window.

In one embodiment, the first TA and the first RE set are used by the first node to determine the first time window, while the second TA and the second RE set are used by the first node to determine the second time window.

In one embodiment, the first time window and the second time window are respectively consecutive time-domain resources.

In one embodiment, the first time window comprises at least one symbol.

In one embodiment, the second time window comprises at least one symbol.

In one embodiment, the first time window comprises multiple consecutive symbols.

In one embodiment, the second time window comprises multiple consecutive symbols.

In one embodiment, the first time window comprises time-domain resources occupied by the first RE set.

Typically, the first time window consists of time-domain resources occupied by the first RE set.

In one embodiment, the second time window comprises time-domain resources occupied by the second RE set.

Typically, the second time window consists of time-domain resources occupied by the second RE set.

In one embodiment, the first RE set comprises a first symbol set in a first slot in a first uplink frame, the first symbol set comprising at least one symbol; the first TA is used to determine a start time of the first uplink frame; the first time window comprises time-domain resources occupied by the first symbol set in the first slot in the first uplink frame.

In one subembodiment, the first time window consists of time-domain resources occupied by the first symbol set in the first slot in the first uplink frame.

In one subembodiment, the first uplink timing is used to determine a start time of the first uplink frame.

In one subembodiment, the first downlink timing and the first TA are used together to determine a start time of the first uplink frame.

In one subembodiment, the first downlink timing is used to determine a start time of a downlink frame corresponding to the first uplink frame at the first node, the first TA being used to determine an advance of a start time of the first uplink frame relative to the start time of the downlink frame corresponding to the first uplink frame at the first node.

In one embodiment, the second RE set comprises a second symbol set in a second slot in a second uplink frame, the second symbol set comprising at least one symbol; the second TA is used to determine a start time of the second uplink frame; the second time window comprises time-domain resources occupied by the second symbol set in the second slot in the second uplink frame.

In one subembodiment, the second time window consists of time-domain resources occupied by the second symbol set in the second slot in the second uplink frame.

In one subembodiment, the second uplink timing is used to determine a start time of the second uplink frame.

In one subembodiment, the second downlink timing and the second TA are used together to determine a start time of the second uplink frame.

In one subembodiment, the second downlink timing is used to determine a start time of a downlink frame corresponding to the second uplink frame at the first node, the second TA being used to determine an advance of a start time of the second uplink frame relative to the start time of the downlink frame corresponding to the second uplink frame at the first node.

In one embodiment, the first uplink frame and the second uplink frame have different uplink timings.

In one embodiment, the first uplink frame and the second uplink frame respectively belong to two different TAGs.

In one embodiment, a start of the first time window is earlier than a start of the second time window.

In one embodiment, the first sub-signal and the second sub-signal are transmitted in a same uplink frame, an uplink timing of the same uplink frame when transmitting the first sub-signal being different from an uplink timing of the same uplink frame when transmitting the second sub-signal.

In one embodiment, the first sub-signal and the second sub-signal are transmitted in a same uplink frame, a start time of the same uplink frame when transmitting the first sub-signal being different from a start time of the same uplink frame when transmitting the second sub-signal.

Typically, the third time window consists of the overlap between the first time window and the second time window.

In one embodiment, a length of the third time window is measured in Tc, where the Tc is a basic time unit.

In one embodiment, a length of the third time window is measured in milliseconds (ms).

In one embodiment, a length of the third time window is measured in seconds (s).

In one embodiment, the first node drops transmitting a part of the first sub-signal that is located in the third time window.

In one subembodiment, the first node transmits a part of the second sub-signal that is located in the third time window.

In one subembodiment, the first node transmits a part of the second sub-signal that is located in the third time window in the second RE set.

In one embodiment, the first node drops transmitting a part of the second sub-signal that is located in the third time window.

In one subembodiment, the first node transmits a part of the first sub-signal that is located in the third time window.

In one subembodiment, the first node transmits a part of the first sub-signal that is located in the third time window in the first RE set.

In one embodiment, the first node drops transmitting a part of the first sub-signal that is located within the third time window and a part of the second sub-signal that is located within the third time window.

In one embodiment, the first node transmits a part of the first sub-signal that does not belong to the third time window and a part of the second sub-signal that does not belong to the third time window.

In one embodiment, the first node transmits a part of the first sub-signal that does not belong to the third time window in the first RE set, and the first node transmits a part of the second sub-signal that does not belong to the third time window in the second RE set.

In one embodiment, when and only when a length of the third time window is greater than a second threshold, the first node drops transmitting a part of the first sub-signal that is located within the third time window.

In one embodiment, when and only when a length of the third time window is greater than a second threshold, the first node drops transmitting a part of the second sub-signal that is located within the third time window.

In one embodiment, when and only when a length of the third time window is greater than a second threshold, the first node drops transmitting a part of the first sub-signal that is located within the third time window and a part of the second sub-signal that is located within the third time window.

In one embodiment, it is not expected to the first node that the first time window and the second time window are overlapping.

In one embodiment, it is not expected to the first node that a length of the overlap between the first time window and the second time window is greater than a second threshold.

In one embodiment, when the first time window and the second time window are overlapping, the first node assumes that there occurs an error.

In one embodiment, when the first time window and the second time window are overlapping, the first node ignores the first signaling.

In one embodiment, when a length of the overlap between the first time window and the second time window is greater than a second threshold, the first node assumes that there occurs an error.

In one embodiment, when a length of the overlap between the first time window and the second time window is greater than a second threshold, the first node ignores the first signaling.

In one embodiment, the second threshold is a non-negative real number.

In one embodiment, the second threshold is a positive real number.

In one embodiment, the second threshold is equal to 0.

In one embodiment, the second threshold is greater than 0.

In one embodiment, the second threshold is configurable.

In one embodiment, the second threshold is default.

Embodiment 14

Figure 14:
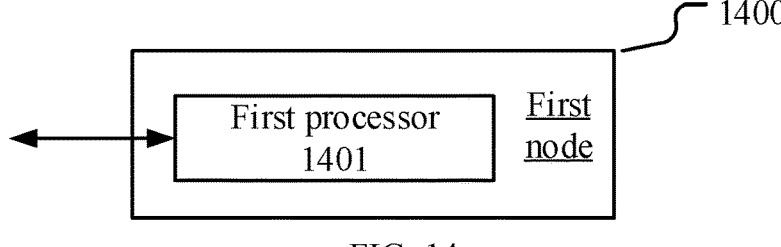
FIG. 14 illustrates a structure block diagram of a processing device in a first node according to one embodiment of the present application.

Embodiment 14 illustrates a structure block diagram of a processing device used in a first node according to one embodiment of the present application; as shown in FIG. 14. In FIG. 14, a processing device 1400 in the first node comprises a first processor 1401.

In Embodiment 14, the first processor 1401 transmits a first information block.

In Embodiment 14, the first information block is related to both a first Timing Advance (TA) and a second TA; the first TA is unequal to the second TA.

In one embodiment, a first SRS resource set corresponds to the first TA, while a second SRS resource set corresponds to the second TA; the first SRS resource set and the second SRS resource set belong to a same cell.

In one embodiment, the first TA and the second TA are used to determine a first timing difference, the first information block being related to the first timing difference.

In one embodiment, the first processor 1401 receives a reference signal in a first reference signal resource set, and receives a reference signal in a second reference signal resource set; herein, the first reference signal resource set comprises at least one reference signal resource, while the second reference signal resource set comprises at least one reference signal resource; the first reference signal resource set is used to determine a first downlink timing, while the second reference signal resource set is used to determine a second downlink timing; the first downlink timing and the first TA are used to determine a first uplink timing, while the second downlink timing and the second TA are used to determine a second uplink timing; the first uplink timing and the second uplink timing are used to determine a first timing difference; the first information block is related to the first timing difference.

In one embodiment, the first timing difference is used to determine whether a first condition is satisfied; as a response to the first condition being satisfied, the first node transmits the first information block.

In one embodiment, the first processor 1401 receives a first signaling, the first signaling being used to determine a first RE set and a second RE set; herein, the first RE set and the second RE set are respectively reserved for a first sub-signal and a second sub-signal; the first signaling indicates that the first RE set is associated with the first SRS resource set, and the first signaling indicates that the second RE set is associated with the second SRS resource set; the first TA and the first RE set are used to determine a first time window, while the second TA and the second RE set are used to determine a second time window; the first time window and the second time window are overlapping, a third time window comprising the overlap between the first time window and the second time window; the first node drops transmitting a part of the first sub-signal that is located within the third time window, or, the first node drops transmitting a part of the second sub-signal that is located within the third time window; or, the first node drops transmitting a part of the first sub-signal that is located within the third time window and a part of the second sub-signal that is located within the third time window.

In one embodiment, the first processor 1401 transmits a first signal; herein, the first signaling comprises scheduling information of the first signal, the first signal comprising a part of at least one of the first sub-signal or the second sub-signal that does not belong to the third time window.

In one embodiment, the first node is a UE.

In one embodiment, the first node is a relay node.

In one embodiment, the first TA and the second TA are applied in a same cell.

In one embodiment, the first TA and the second TA are applied in a same BWP.

In one embodiment, the first condition comprises: an absolute value of the first timing difference being greater than a first threshold.

In one embodiment, the first condition comprises: an absolute value of the first timing difference being greater than or equal to a first threshold.

In one embodiment, a first given SRS resource is any SRS resource in the first SRS resource set, while a second given SRS resource is any SRS resource in the second SRS resource set; the first node transmits an SRS in the first given SRS resource using a same spatial domain filter as that for receiving a reference signal in a reference signal resource in the first reference signal resource set, and the first node transmits an SRS in the second given SRS resource using a same spatial domain filter as that for receiving a reference signal in a reference signal resource in the second reference signal resource set; a reception for a reference signal in the first reference signal resource set is used to determine the first downlink timing, while a reception for a reference signal in the second reference signal resource set is used to determine the second downlink timing; when the first node uses an antenna port the same as an SRS port of at least one SRS resource in the first SRS resource set to transmit a signal in an uplink frame i, the first downlink timing is used to determine a start time of a downlink frame corresponding to the uplink frame i at the first node, where the first TA is used to determine an advance of a start time of the uplink frame i relative to the start time of the downlink frame corresponding to the uplink frame i at the first node; when the first node uses an antenna port the same as an SRS port of at least one SRS resource in the second SRS resource set to transmit a signal in an uplink frame i, the second downlink timing is used to determine a start time of a downlink frame corresponding to the uplink frame i at the first node, where the second TA is used to determine an advance of a start time of the uplink frame i relative to the start time of the downlink frame corresponding to the uplink frame i at the first node.

In one embodiment, the first processor 1401 comprises at least one of the antenna 452, the receiver/transmitter 454, the receiving processor 456, the transmitting processor 468, the multi-antenna receiving processor 458, the multi-antenna transmitting processor 457, the controller/processor 459, the memory 460 or the data source 467 in Embodiment 4.

Embodiment 15

Figure 15:
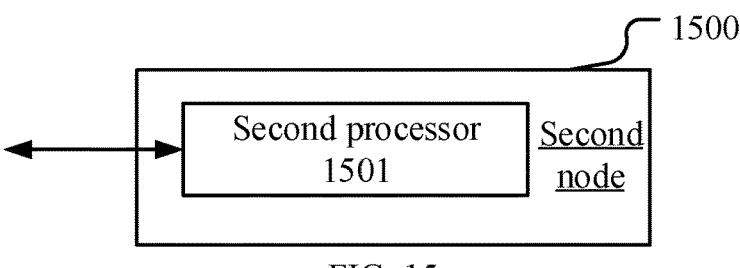
FIG. 15 illustrates a structure block diagram a processing device in a second node according to one embodiment of the present application.

Embodiment 15 illustrates a structure block diagram of a processing device used in a second node according to one embodiment of the present application; as shown in FIG. 15. In FIG. 15, a processing device 1500 in the second node comprises a second processor 1501.

In Embodiment 15, the second processor 1501 receives a first information block.

In Embodiment 15, the first information block is related to both a first Timing Advance (TA) and a second TA; the first TA is unequal to the second TA.

In one embodiment, a first SRS resource set corresponds to the first TA, while a second SRS resource set corresponds to the second TA; the first SRS resource set and the second SRS resource set belong to a same cell.

In one embodiment, the first TA and the second TA are used to determine a first timing difference, the first information block being related to the first timing difference.

In one embodiment, the second processor 1501 performs at least one of:

transmitting a reference signal in a first reference signal resource set; or transmitting a reference signal in a second reference signal resource set;

herein, the first reference signal resource set comprises at least one reference signal resource, while the second reference signal resource set comprises at least one reference signal resource; the first reference signal resource set is used to determine a first downlink timing, while the second reference signal resource set is used to determine a second downlink timing; the first downlink timing and the first TA are used to determine a first uplink timing, while the second downlink timing and the second TA are used to determine a second uplink timing; the first uplink timing and the second uplink timing are used to determine a first timing difference; the first information block is related to the first timing difference.

In one embodiment, the first timing difference is used to determine whether a first condition is satisfied; as a response to the first condition being satisfied, a transmitter of the first information block transmits the first information block.

In one embodiment, the second processor 1501 transmits a first signaling, the first signaling being used to determine a first RE set and a second RE set; herein, the first RE set and the second RE set are respectively reserved for a first sub-signal and a second sub-signal; the first signaling indicates that the first RE set is associated with the first SRS resource set, and the first signaling indicates that the second RE set is associated with the second SRS resource set; the first TA and the first RE set are used to determine a first time window, while the second TA and the second RE set are used to determine a second time window; the first time window and the second time window are overlapping, a third time window comprising the overlap between the first time window and the second time window; a target receiver of the first signaling drops transmitting a part of the first sub-signal that is located within the third time window, or, a target receiver of the first signaling drops transmitting a part of the second sub-signal that is located within the third time window; or, a target receiver of the first signaling drops transmitting a part of the first sub-signal that is located within the third time window and a part of the second sub-signal that is located within the third time window.

In one embodiment, the second processor 1501 receives a first signal; herein, the first signaling comprises scheduling information of the first signal, the first signal comprising a part of at least one of the first sub-signal or the second sub-signal that does not belong to the third time window.

In one embodiment, the second node is a base station.

In one embodiment, the second node is a UE.

In one embodiment, the second node is a relay node.

In one embodiment, the first TA and the second TA are applied in a same cell.

In one embodiment, the first TA and the second TA are applied in a same BWP.

In one embodiment, the first condition comprises: an absolute value of the first timing difference being greater than a first threshold.

In one embodiment, the first condition comprises: an absolute value of the first timing difference being greater than or equal to a first threshold.

In one embodiment, a first given SRS resource is any SRS resource in the first SRS resource set, while a second given SRS resource is any SRS resource in the second SRS resource set; the first node transmits an SRS in the first given SRS resource using a same spatial domain filter as that for receiving a reference signal in a reference signal resource in the first reference signal resource set, and the first node transmits an SRS in the second given SRS resource using a same spatial domain filter as that for receiving a reference signal in a reference signal resource in the second reference signal resource set; a reception for a reference signal in the first reference signal resource set is used to determine the first downlink timing, while a reception for a reference signal in the second reference signal resource set is used to determine the second downlink timing; when the first node uses an antenna port the same as an SRS port of at least one SRS resource in the first SRS resource set to transmit a signal in an uplink frame i, the first downlink timing is used to determine a start time of a downlink frame corresponding to the uplink frame i at the first node, where the first TA is used to determine an advance of a start time of the uplink frame i relative to the start time of the downlink frame corresponding to the uplink frame i at the first node; when the first node uses an antenna port the same as an SRS port of at least one SRS resource in the second SRS resource set to transmit a signal in an uplink frame i, the second downlink timing is used to determine a start time of a downlink frame corresponding to the uplink frame i at the first node, where the second TA is used to determine an advance of a start time of the uplink frame i relative to the start time of the downlink frame corresponding to the uplink frame i at the first node.

In one embodiment, the second processor 1501 comprises at least one of the antenna 420, the receiver/transmitter 418, the receiving processor 470, the transmitting processor 416, the multi-antenna receiving processor 472, the multi-antenna transmitting processor 471, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, vehicles, automobiles, RSU, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, eNB, gNB, Transmitter Receiver Point (TRP), GNSS, relay satellite, satellite base station, airborne base station, Road Side Unit (RSU), drones, test equipment like transceiving device simulating partial functions of base station or signaling tester.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) for wireless communications, the UE comprising:

a transceiver; and a processor, wherein the transceiver and the processor are configured to:

transmit a first information block associated with first and second Timing Advances (TAs) corresponding to first and second Sounding Reference Signal (SRS) resource sets respectively 2 wherein the first TA is unequal to the second TA, and wherein the first and second SRS resource sets belong to a same cell, receive a first signaling, determine, based on the first signaling, first and second Resource Element (RE) sets reserved for first and second sub-signals respectively, wherein the first and second RE sets are associated with first and second SRS resource sets respectively, determine, based on the first and second TAs, first and second time windows, determine a third time window comprising an overlap between the first time window and the second time window, and drop transmission of at least one of a part of the first and second sub-signals located within the third time window.

2. The UE according to claim 1, wherein the transceiver and the processor are configured to:

determine, based on the first and second TAs, a first timing difference associated with the first information block.

3. The UE according to claim 2, wherein the transceiver and the processor are configured to:

determine, based on the first timing difference, whether a first condition is satisfied, and as a response to the first condition being satisfied, transmit the first information block.

4. The UE according to claim 1, wherein the transceiver and the processor are configured to:

receive first and second reference signals in first and second reference signal resource sets respectively, determine, based on the first and second reference signal resource sets, first and second downlink timings, determine a first uplink time based on the first downlink timing and the first TA, determine a second uplink timing based on the second downlink timing and the second TA, and determine, based on the first uplink timing and the second uplink timing, a first timing difference associated with the first information block.

5. The UE according to claim 4, wherein the transceiver and the processor are configured to:

determine, based on the first timing difference, whether a first condition is satisfied, and as a response to the first condition being satisfied, transmit the first information block.

6. The UE according to claim 1, wherein the transceiver and the processor are configured to:

transmit a first signal, wherein the first signaling comprises scheduling information of the first signal, and wherein the first signal comprises a part of at least one of the first or second sub-signals that does not belong to the third time window.

7. A base station for wireless communications, the base station comprising:

a transceiver; and a processor, wherein the transceiver and the processor are configured to:

receive a first information block;

associated with first and second Timing Advances (TAs) corresponding to first and second Sounding Reference Signal (SRS) resource sets respectively, wherein the first TA is unequal to the second TA, and wherein the first and second SRS resource sets belong to a same cell, and transmit a first signaling, wherein the first signaling is used to determine first and second Resource Element (RE) sets associated with the first and second SRS resource sets, and wherein the first RE set and the second RE set are respectively reserved for a first sub-signal and a second sub-signal, wherein the first TA and the first RE set are used to determine a first time window, while the second TA and the second RE set are used to determine a second time window, and wherein the first time window and the second time window are overlapping, a third time window comprising the overlap between the first time window and the second time window, and wherein a target receiver of the first signaling drops transmitting a part of the first sub-signal that is located within the third time window, or, a target receiver of the first signaling drops transmitting a part of the second sub-signal that is located within the third time window; or, a target receiver of the first signaling drops transmitting a part of the first sub-signal that is located within the third time window and a part of the second sub-signal that is located within the third time window.

8. The base station according to claim 7, wherein the transceiver and processor are configured to:

transmit a reference signal in a first reference signal resource set, or transmit a reference signal in a second reference signal resource set, wherein first TA and the second TA are used to determine a first timing difference, the first information block being related to the first timing difference, and wherein the first reference signal resource set comprises at least one reference signal resource, and wherein the second reference signal resource set comprises at least one reference signal resource, and wherein the first reference signal resource set is used to determine a first downlink timing, and wherein the second reference signal resource set is used to determine a second downlink timing, and wherein the first downlink timing and the first TA are used to determine a first uplink timing, and wherein the second downlink timing and the second TA are used to determine a second uplink timing, and wherein the first uplink timing and the second uplink timing are used to determine a first timing difference, and wherein the first information block is related to the first timing difference.

9. The base station according to claim 8, wherein the first timing difference is used to determine whether a first condition is satisfied, and wherein as a response to the first condition being satisfied, a transmitter of the first information block transmits the first information block.

10. The base station according to claim 7, wherein the transceiver and the processor are configured to:

receive a first signal, wherein the first signaling comprises scheduling information of the first signal, the first signal comprising a part of at least one of the first sub-signal or the second sub-signal that does not belong to the third time window.

11. A method in a user equipment (UE) for wireless communications, the method comprising:

transmitting a first information block;

associated with first and second TAs corresponding to first and second Sounding Reference Signal (SRS) resource sets respectively, wherein the first TA is unequal to the second TA, and wherein the first and second SRS resource sets belong to a same cell;

receiving a first signaling;

determining, based on the first signaling, first and second Resource Element (RE) sets reserved for first and second sub-signals respectively, wherein the first and second RE sets are associated with first and second SRS resource sets respectively;

determining, based on the first and second TAs, first and second time windows;

determining a third time window comprising an overlap between the first time window and the second time window; and dropping transmission of at least one of a part of the first and second sub-signals located within the third time window.

12. The method according to claim 11, further comprising:

determining, based on the first and second TAs, a first timing difference associated with the first information block; and receiving first and second reference signals in first and second reference signal resource sets respectively;

determining, based on the first and second reference signal resource sets, first and second downlink timings;

determining a first uplink timing based on the first downlink timing and the first TA;

determining a second uplink timing based on the second downlink timing and the second TA; and determining, based on the first uplink timing and the second uplink timing, a first timing difference associated with the first timing difference.

13. The method according to claim 12, further comprising:

determining, based on the first timing difference, whether a first condition is satisfied; and as a response to the first condition being satisfied, transmitting the first information block.

14. The method according to claim 11, further comprising:

transmitting a first signal, wherein the first signaling comprises scheduling information of the first signal, and wherein the first signal comprises a part of at least one of the first or second sub-signals that does not belong to the third time window.

* * * * *